United States Patent
Johnson et al.

[11] Patent Number: 5,907,800
[45] Date of Patent: *May 25, 1999

[54] APPARATUS FOR USE IN INHIBITING TELECOMMUNICATION SUBSCRIBER TERMINATION

[75] Inventors: Eric A. Johnson, Longmont; Howard Kaushansky, Nederland; Sunil Prakash, Westminster; Martin Brunecky, Arvada; Eileen M. McGrath-Hadwen, Boulder, all of Colo.

[73] Assignee: Lightbridge, Inc., Burlington, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/486,215

[22] Filed: Jun. 7, 1995

[51] Int. Cl.⁶ .................................................. H04Q 7/20
[52] U.S. Cl. ........................... 455/405; 455/403; 379/114
[58] Field of Search ................................. 379/58, 59, 60, 379/112–118, 119–122, 130; 455/33.1, 403, 405–408, 422, 550

[56] References Cited

U.S. PATENT DOCUMENTS

| | | | |
|---|---|---|---|
| 4,751,728 | 6/1988 | Treat | 379/113 |
| 5,027,388 | 6/1991 | Bradshaw et al. | 379/112 |
| 5,148,472 | 9/1992 | Freese et al. | 379/59 |
| 5,303,297 | 4/1994 | Hillis | 379/63 |
| 5,325,418 | 6/1994 | McGregor et al. | 379/59 |
| 5,488,655 | 1/1996 | Hamlen | 379/114 |
| 5,490,204 | 2/1996 | Gulledge | 379/59 |
| 5,570,417 | 10/1996 | Byers | 379/114 X |
| 5,615,408 | 3/1997 | Johnson et al. | 455/33.1 |
| 5,625,669 | 4/1997 | McGregor et al. | 379/58 |
| 5,659,601 | 8/1997 | Cheslog | 455/406 |

FOREIGN PATENT DOCUMENTS 0132294  6/1991  Japan ........................................ 379/58

OTHER PUBLICATIONS

"Solutions Advanced Wireless Solutions, The Services You're Calling For Now", published by GTE Telecommunication Services, 2 pages (Jan. 1995).

"TechFlash Advanced Wireless Solutions, The Services you're Calling For Now", published by GTE Telecommunication Services, 3 pages (Jan. 1995).

*Primary Examiner*—Dwayne D. Bost
*Assistant Examiner*—William G. Trat
*Attorney, Agent, or Firm*—Foley, Hoag & Eliot LLP

[57] ABSTRACT

The present invention provides an apparatus for detecting potential subscriber dissatisfaction and preventing termination by subscribers of telecommunication services providers. One embodiment of the apparatus includes an interface for receiving information regarding a subscriber. A processing device then utilizes the information to determine if the subscriber is likely to terminate his subscription. An output device is used to initiate action to prevent a subscriber who may be likely to terminate from terminating his subscription. Another embodiment of the apparatus includes a device for using rate plan information to determine if a subscriber is likely to terminate his subscription.

30 Claims, 15 Drawing Sheets

APPARATUS FOR USE IN INHIBITING TELECOMMUNICATION SUBSCRIBER TERMINATION

BACKGROUND OF THE INVENTION

1. Field of the Invention

This invention relates to monitoring telecommunication systems, and more specifically, to an apparatus for detecting potential dissatisfaction and preventing termination by subscribers of telecommunication services providers. Telecommunication systems include both wireless systems (e.g., cellular telephones, satellite transmission, etc.) and systems utilizing transmission lines (e.g., common telephone systems). Subscriber termination refers to action by subscribers to a telecommunication service to terminate or modify the conditions of service provided to the subscriber by a particular telecommunications service provider. The invention also relates to measurement of customer satisfaction of telecommunication system subscribers.

2. Description of the Related Art

Because immediate access to information has become a necessity in virtually all fields of endeavor—including business, finance and science—telecommunication systems usage, particularly for wireless telecommunication systems, is increasing at a substantial rate. Along with the growth in telecommunication use has come a proliferation of telecommunication service providers. As a result, a variety of service alternatives has become available to consumers.

Subscribers to telecommunications services, particularly wireless telecommunications services, who are dissatisfied with the quality of service or the value of the service provided by a particular provider may terminate their current service and subscribe to a different service. This switching behavior is sometimes referred to as "churning".

Churning has a negative effect on telecommunications service providers. In many cases, the initial cost to a provider of signing up a subscriber and providing the initial service to that subscriber cannot be recouped by the provider unless the subscriber uses the service over a period of time. Accordingly, detecting and remedying situations which might cause a subscriber to terminate the service before the end of that time period would be highly desirable.

Therefore, a system which reliably and accurately identifies potential consumer dissatisfaction permits a provider to take preventative action, thus reducing the likelihood that the subscriber will terminate the service, and which is compatible with all types of existing telecommunication equipment, is needed.

SUMMARY OF THE INVENTION

It is an object of the present invention to provide an apparatus for preventing subscriber termination by identifying the existence of conditions which tend to result in subscriber dissatisfaction and initiating action to remove or modify such conditions.

In one embodiment of the invention, a particular subscriber's usage is analyzed to determine the cost of the subscriber's use under the rate plan currently in effect. The subscriber's usage is also used to determine what the consumer would have paid for the same usage under a different rate plan offered by the same service provider. If the subscriber's usage would have cost less under a different plan, the provider may wish to notify the subscriber of the availability of the alternate plan.

In another embodiment, a particular subscriber's usage is analyzed to determine the cost of the subscriber's use under the rate plan currently in effect. The subscriber's usage is also used to determine what the consumer would have paid for the same usage under a rate plans available from competitors. Availability of a competitor's rate plan which is less costly indicates the customer may become dissatisfied, increasing the likelihood of termination of the existing service.

In a further embodiment, a particular subscriber's usage is analyzed to determine the roaming usage of the subscriber. Roaming usage occurs when a subscriber uses a service outside his "home" area. The subscriber's roaming usage is used to determine whether the cost of the subscriber's usage under a competitor's rate plan would have been less than the cost of the subscriber's usage under the rate plan currently in effect. Availability of a competitor's rate plan which is less costly indicates the customer may become dissatisfied, increasing the likelihood of termination of the existing service.

In another embodiment, a particular subscriber's usage is characterized as a moving average of call velocity (number of calls over a given time period) calculated over a specified number of days. The moving average is compared to a threshold amount to determine if the moving average is less than the threshold amount. The threshold amount may comprise a fixed number or a percentage of the moving average. When usage is less than a threshold amount, the subscriber may be more likely to terminate service.

In one embodiment, a particular subscriber's usage is characterized as a moving average of call velocity (number of calls over a given time period) calculated over a specified number of days, which is compared to a prior moving average over a time period to determine if a significant decrease in usage has occurred. When a significant decrease in usage is detected, the subscriber may be more likely to terminate service.

In another embodiment of the invention, a particular subscriber's usage is characterized as a plurality of moving averages, each calculated over a different specified number of days, which are then compared to each other to determine if a significant deviation in usage has occurred. If the moving average calculated over a longer number of days has exceeded the moving average calculated over the shorter period for a period of time, the subscriber may be more likely to terminate service.

In a further embodiment of the invention, a subscriber's usage over a period of time is analyzed to determine the cumulative cost of the subscriber's use during a defined period. The cumulative cost during the period is compared to the subscriber's budget for a specified period to determine if the subscriber has exceeded or appears likely to exceed the budgeted amount for the specified period. A usage pattern which indicates that the subscriber has exceeded or is likely to exceed the budgeted amount indicates that the subscriber may be likely to terminate service. The subscriber may be notified that he has exceeded or may be likely to exceed the budgeted amount in order to allow the subscriber to control his subsequent usage.

In yet another embodiment of the invention, a particular subscriber's account information is analyzed to determine if the subscriber has canceled any customized features of the service, such as call waiting, within a specified time period. Cancellation of customized features indicates that the subscriber may be likely to terminate service.

In another embodiment of the invention, a particular subscriber's account information is analyzed to determine the date the subscriber commenced service and the length of time from commencement of service. The approach of the end of a defined period from commencement, such as the end of a term of a service contract, may indicate that the subscriber is likely to terminate service.

It is a further object of the present invention to provide apparatus for preventing subscriber termination by identifying the existence of service conditions which tend to result in dissatisfaction for groups of subscribers and initiating action to remove or modify such conditions.

In one embodiment, calls which are initiated during a period are analyzed to determine if the calls are properly terminated. Improper termination may occur when a call is interrupted due to a transmission or reception problem before a party intentionally terminates the call. If calls are not properly terminated, the apparatus identifies the location of the problem. If an identified location, such as a cellsite in the case of cellular service, has more than a threshold number of improper terminations, corrective action may be taken. In addition, a large number of improper terminations indicates possible customer dissatisfaction.

In another embodiment, calls which are initiated during a period are analyzed to determine if the calls are not properly connected. Failure to establish a connection may be due to a number of factors, including lack of equipment capacity or equipment malfunction. If the calls are not properly connected, the apparatus identifies the location or cause of the problem. If an identified location or cause, such as a piece of equipment, has more than a threshold number of connection failures, corrective action may be taken. In addition, a large number of connection failures indicates possible customer dissatisfaction.

It is yet another object of the present invention to provide apparatus for preventing subscriber termination by identifying the existence of conditions which tend to result in dissatisfaction for groups of subscribers and to determine whether a proposed remedy is feasible.

In one embodiment, a particular subscriber's usage is analyzed to determine which cellsites a subscriber uses. Cellsite usage includes initiating calls and calls which are "handed off" or transferred from one cellsite to another as the subscriber changes location during a call. If a particular subscriber uses a number of cellsites which exceeds a threshold amount, he may be likely to be more satisfied with a different rate plan than that currently in use. Similarly, cellsite usage for a number of subscribers may be analyzed to determine if a new or different rate plan would be likely increase subscriber satisfaction for those subscribers whose cellsite usage exceeds a threshold amount.

In one embodiment of the invention, usage by each of a group of subscribers is analyzed to determine the cost of each subscriber's use under the rate plan currently in effect. Each subscriber's usage is also used to determine what the consumer would have paid for the same usage under a proposed rate plan. If the usage by more than a threshold amount of members of the group would have cost less under a different plan, the provider may consider adoption of the proposed plan.

Several of the above-mentioned objects are achieved by an apparatus comprising a digital computer; an interface for receiving subscriber related information; a processor for processing subscriber related information to determine if there is a likelihood of a subscriber terminating their subscription; and an output device, for initiating action to prevent a subscriber from terminating their subscription.

These and other features of the present invention will become evident from the detailed description set forth hereafter with reference to the accompanying drawings.

BRIEF DESCRIPTION OF DRAWINGS

A more complete understanding of the invention can be had by referring to the detailed description of the invention and the drawings in which.

DETAILED DESCRIPTION OF THE INVENTION

A detailed description of an apparatus for detecting subscriber dissatisfaction and preventing a subscriber of a telecommunications service provider from terminating their subscription is set forth below with reference to the figures. Although apparatus will be described particularly with reference to cellular telephone networks, it will be understood that the invention is equally applicable in other telecommunication contexts including, but not limited to, personal communication service (PCS) networks and wire based systems.

Figure 1:
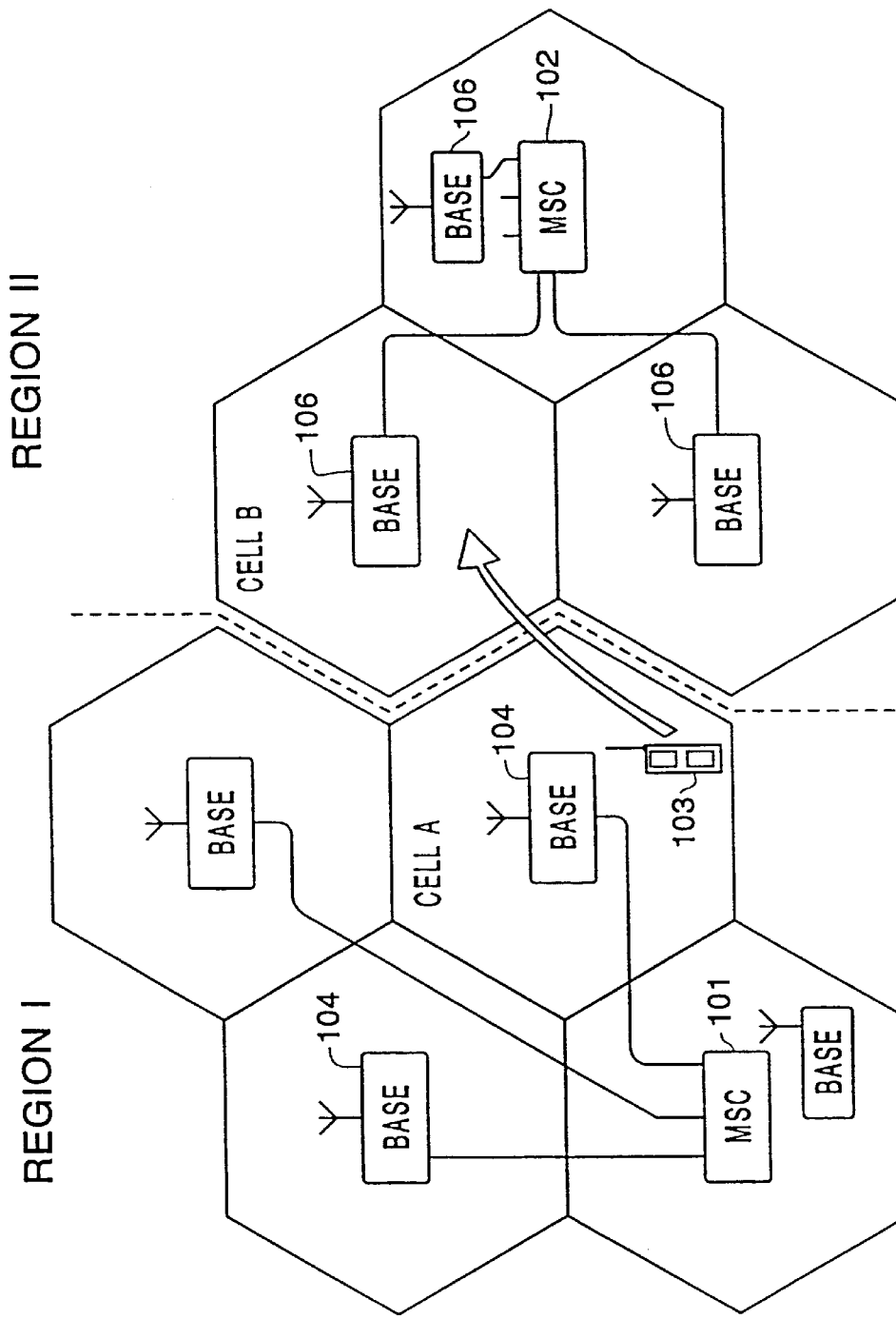
FIG. 1 is a diagram illustrating a typical cellular telecommunications network.

A diagram illustrating a typical cellular telecommunications network is illustrated in FIG. 1. Referring to FIG. 1, each predetermined fixed geographic region is served by a separate Mobile Switching Center (MSC). Additionally, each MSC region may comprise one or more cells, wherein each cell is served by its own base station connected to the MSC for that region. In FIG. 1, Region I is served by a first MSC 101 while Region II is served by a second MSC 102. Region I comprises four cells each having its own base station 104 connected to the first MSC 101. Region II comprises three cells each having its own base station 106 connected to the second MSC 102. A base station 104 may also be referred to as a "cellsite".

One function of a MSC is to receive and route both cellular originated calls and cellular terminated calls. A cellular originated call is one placed by a cellular telephone located within the MSC serving area to either another cellular telephone or a physical line telephone. A cellular terminated call is one received by a cellular telephone located within the MSC serving area, regardless if placed by a cellular or physical line telephone.

The MSC which serves the geographic region in which a subscriber is based is considered a subscriber's "home" MSC. For example, MSC 101 would be the home MSC for a subscriber based in Region I. Similarly, MSC 102 would be the home MSC for a subscriber based in Region II. In addition to routing calls, each MSC is ultimately responsible for monitoring its home subscriber's usage.

When a subscriber originates a call, the cellular telephone 103 communicates via a base station with the particular MSC serving that geographic region by means of wireless radiofrequency transmission. The subscriber may either remain within the particular cell from which the call was originated or the subscriber may "roam" across cell and MSC region boundaries. For example, a cellular call may be originated by a subscriber in Cell A and the call would be handled initially by the first MSC 101. However, because cellular telephones are mobile, the subscriber could travel from Cell A into Cell B during the course of the call. Upon crossing from Cell A into Cell B, the call would cease being handled by the first MSC 101 and may be picked up mid-call and handled by the second MSC 102. This transfer between cells is sometimes referred to as "handing-off".

Multiple MSCs are dispersed throughout the United States, and much of the world, so that a subscriber may call from any geographic region served by a MSC. Many of the various MSCs around the world are interconnected by regional or global telecommunications networks, so that telecommunications may occur between two cellular telephones, or between a cellular telephone and a physical line telephone, even if they are in different geographic regions.

Each subscriber's cellular telephone has its own unique ID corresponding to a set of identification numbers. The identification numbers comprise two individual identifiers—Mobile Identification Number (MIN), and (2) an Electronic Serial Number (ESN). The ESN is a unique serial number associated with the cellular telephone. The MIN is a ten-digit number, corresponding to the ten-digit telephone number used in North America, having the format npa-nxx-xxxx, where npa corresponds to the first three digits in the area code in North America, nxx corresponds to the next three digits which identify the serving switch in North America, and xxxx corresponds to the last four digits which identify the individual subscriber or physical line number. It will be appreciated by one of ordinary skill in the art that the format of the MIN may change based upon particular requirements. For example, the MIN may be modified to include a code which identifies the country in which the subscriber resides. The combination of the npa and nxx components form a number which identifies a subscriber's "home" MSC. At the initiation of each call, the cellular telephone transmits to the MSC its unique combination of MIN and ESN. At the termination of each call, whether cellular originated or cellular terminated, each MSC handling the call creates a separate Call Detail Record (CDR) which contains several items of information describing the call and the subscriber. For example, the CDR contains the following call information items: MIN, ESN, number called, call duration, call origination date and time, country called, information identifying the MSC, etc. The format of the CDR, however, is not consistent among the several different providers of cellular telephone equipment or service. At present, for example, at least five different CDR formats exist.

As mentioned above, each individual subscriber has a home MSC identified by the combination of the npa and nxx components of the subscriber's MIN. In some cases, unless a cellular subscriber has previously notified the home MSC of his or her whereabouts, the subscriber may only receive a cellular terminated call when that subscriber is within his or her home MSC region. In other cases the subscriber may inform the home MSC of his whereabouts automatically, through periodic transmissions to the visited MSC. In most cases, a subscriber may initiate a cellular originated call, however, from any MSC region without any special proactive requirements.

A subscriber who engages in telecommunication activity from a region other than his or her home MSC region is referred to as a "roamer." For example, a subscriber based in Region I who originates a call from Region II would be considered a roaming subscriber in Region II. In current practice, when a roaming subscriber places a call, the visited MSC incurs charges for the call. These charges are then billed back to the user's home MSC which, in turn, bills the user.

For each roamer call completed by a MSC, the MSC records CDR information for that call and sends the information to either a clearing house or to the home carrier. The clearing house collects all CDRs pertaining to a particular MSC, creates a magnetic tape—a roamer tape—containing multiple CDRs, and sends the tape to the appropriate home carrier. Alternatively, the CDR information can be sent to the home carrier electronically.

Figure 2:
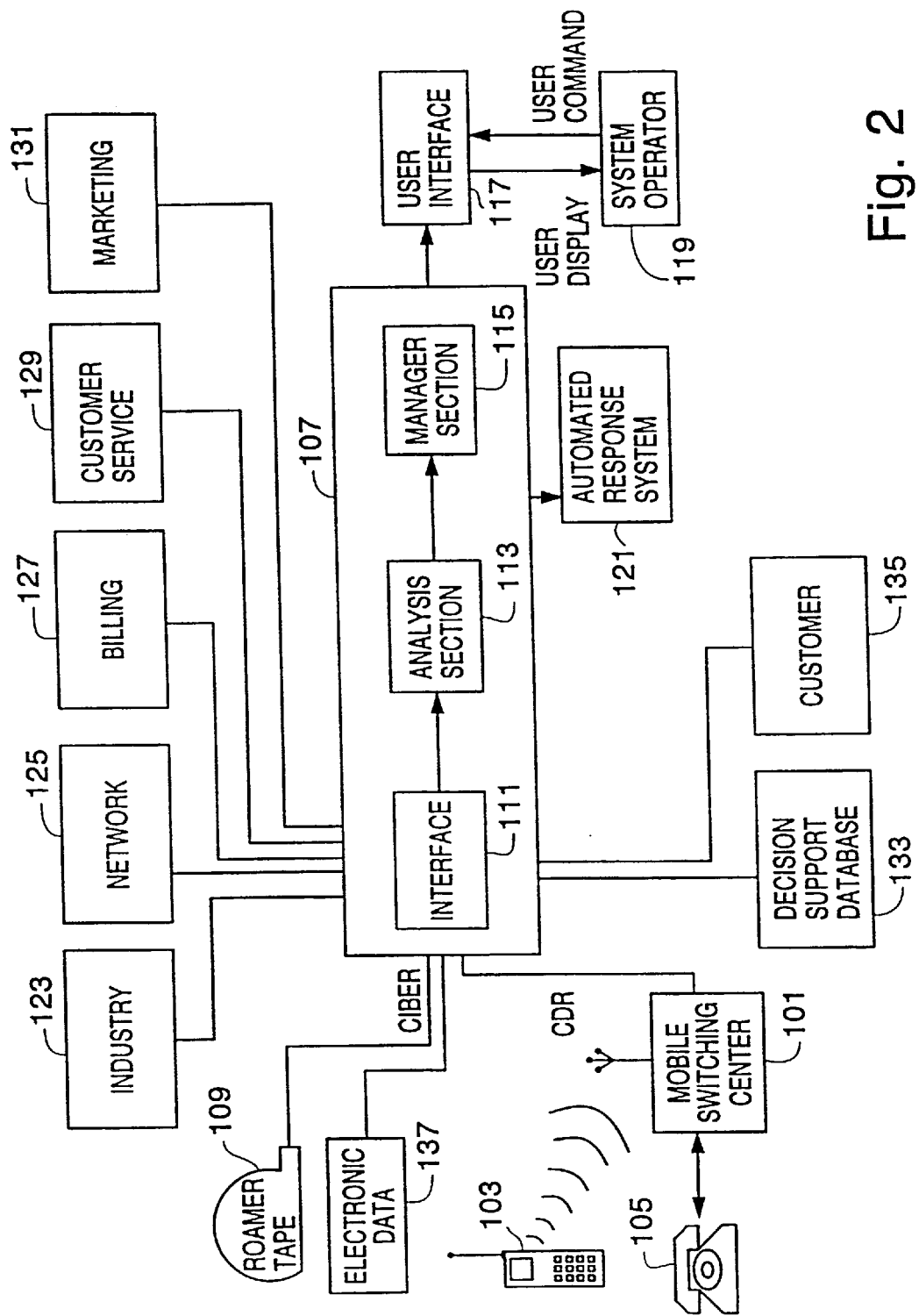
FIG. 2 is a block diagram of system for preventing a subscriber of a telecommunications service provider from terminating their subscription according to one embodiment of the present invention.

FIG. 2 is a block diagram of a system for preventing subscriber termination according to one embodiment of the present invention. Initially, a general description of the system 107 is provided as follows.

The subscriber termination prevention system 107 of the present invention, comprising the interface 111, the analysis section 113 and the manager section 115 is implemented, in one embodiment, as software running on a digital computer, for example, a Sun Microsystems computer. The digital computer includes memory means for storing computer programs and data; processing means for running computer programs and manipulating data; input/output means for communicating with external information sources or another computer (not shown) and input/output means allowing user control and information display.

The system 107 may be connected to a variety of external data sources through interface 111, and information may be both obtained from and sent to such external data sources by the system 107. Among the types of external data sources are the relevant telecommunications industry 123, which may be a source of information relating to competitor's rate plans and demographic information about customers; a cellular network 125, as described in FIG. 1, which may be a source of system status information, including improper call termination information; a billing system 127, which may be a source of detailed information relating to calls; a customer service function 129, which may be a source of customer profile information and a recipient of information generated by the system; and a marketing function 131, which may be a source of rate plan information as well as a recipient of information generated by the system. The interface 111 transforms the data from the form in which it is received from external data sources into the form subsequently used by the system 107. It will be appreciated that the system may be advantageously connected to other systems not shown on FIG. 2, such as a fraud detection system and a credit checking system, particularly in situations where such connected systems may be receiving and processing the same or similar data. The system 107 may also be connected through the interface 111 to recipients of data generated by the system 107, such as a decision support database 133 and a customer 135.

In addition, records for both cellular originated and cellular terminated calls may variously be obtained from the MSC 101 directly, from electronic data sources 137 and from a roamer tape 109 through interface 111. After the switch interface 111 translates a CDR record into a format understandable to the system 107—the CCF format—a CCF record is passed to the analysis section 113.

The function of the analysis section 113 is to perform various types of analysis of subscriber related information in order to detect conditions which may tend to indicate that a subscriber is likely to terminate and to generate information which is useful in preventing subscriber termination. The results of the analysis may be communicated to the manager section 115 and may also be communicated to an automated response system 121. The manager section 115 is comprised of an alert manager, an analysis manager, a network manager and a new rate plan manager. Upon receipt of analysis results in the form of an "alert," the manager may initiate action to prevent a subscriber that is likely to terminate their subscription from doing so. In one embodiment, the initiation of action comprises sending a message to the user interface 117 identifying the existence of an alert and identifying the type of the alert, thus enabling the service provider to take corrective action. The user interface 117 allows a system operator 119 to receive information from the system 107 and to input data and control the system.

Results of analysis performed in the analysis section 113 may also be communicated to an automated response system 121. If the automated response system 121 receives a notification, it may take corresponding action to prevent subscriber termination. For example, if the automated response system 121 received a notification from the analysis section 113 that indicated a subscriber's subscription contract period was about to expire, the automated response system might generate and send a letter to the subscriber offering a discount on certain service if the subscriber renewed their subscription contract.

With further reference to FIG. 2, when a cellular telephone 103 is located in its "home" MSC, cellular telephone 103 communicates with a MSC 101 to place a call either to a physical line telephone 105 or to another cellular telephone. Additionally, the cellular telephone 103 may receive a call originated by either a physical line telephone 105 or another cellular telephone. Upon termination of the call, the MSC 101 creates a separate CDR record for each call that it handles, whether cellular originated or cellular terminated. MSC 101 is connected to subscriber termination prevention system 107 which may receive CDR records as input from MSC 101. The CDR input read directly from the MSC 101 into the system 107 corresponds to calls handled by MSC 101 for its home subscribers. CDR records not involving MSC's home subscribers may be sent to a clearing house to generate roamer tapes to be sent to the appropriate home MSC or are electronically transmitted to the appropriate home MSC. The records received from an MSC or from a roamer tape 109 are translated into a form subsequently used by the system 107 by the interface 111. The system 107 may also receive input from a roamer tape 109 by means of a magnetic tape reader (not shown). The input may be stored in a format referred to as the CIBER format, or may be stored in other formats. In addition to the input sources discussed herein, it should be appreciated that additional input sources exist and may be available to the system 107.

Figure 3:
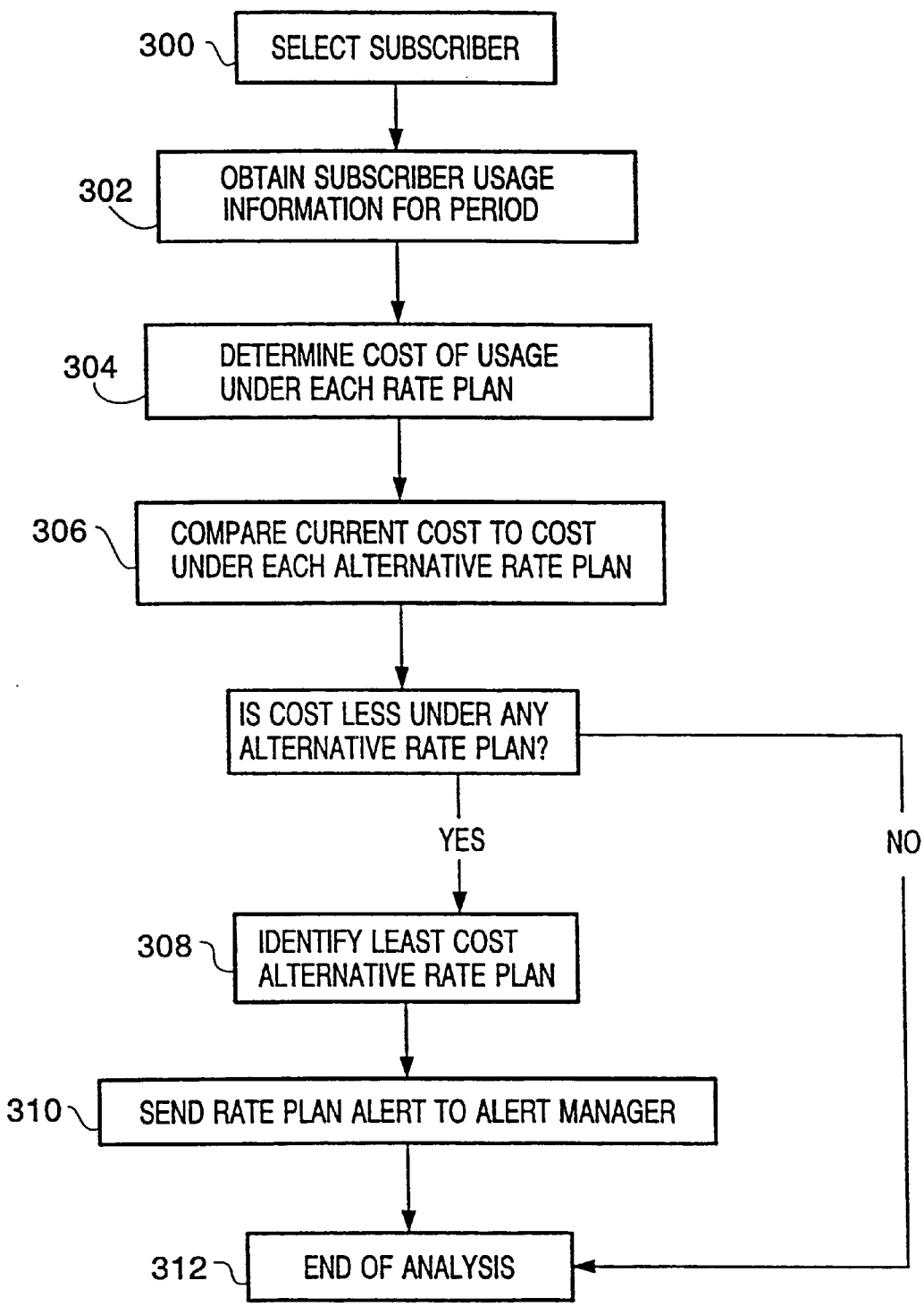
FIG. 3 is a flowchart that illustrates the procedure for using an embodiment of the invention for analysis of a subscriber's usage in relation to existing rate plans.

FIG. 3 illustrates one embodiment of the present invention wherein the system is used to analyze a subscriber's usage in relation to existing rate plans. If an existing rate of the service provider is more cost effective for the subscriber, the provider may want to so inform the subscriber. This permits the provider to build subscriber goodwill and prevent termination if the subscriber should find out that a better rate plan was available but not promoted to them. First, at step 300, the subscriber is selected. Next, at step 302, a record of the usage by that subscriber during a defined time period, such as a month, is obtained. Next, at step 304, the provider's rate plans are identified and the parameters of each rate plan are applied to the usage information to determine the cost of the usage under each rate plan. The rate plan parameters comprise the parameters of the rate plan currently in effect for the subscriber and the parameters of other rate plans offered by the service provider which are available to the subscriber. Some of the typical rate plan parameters include number of calls, the times call were initiated, the length of time of each call and the cumulative length of all calls. While the embodiment shown in FIG. 3 uses the usage information to determine total cost to a subscriber under a rate plan, it should be appreciated that the cost of any discrete parameter of use, such as number of calls or minutes of use, may be determined using the present invention.

Next, at step 306, the cost under the rate plan currently in effect for the subscriber is compared to the cost under each of the other rate plans. If the subscriber's cost would have been less under any of the other plans, the system flows to step 308. If not, the analysis is completed and the system flows to step 312 where operation is terminated.

At step 308, the alternative rate plan that would have had the least cost is identified. Next, at step 310, a rate plan alert is sent to the alert manager. The rate plan alert comprises information identifying the subscriber, the rate plan currently in effect and the alternative rate plan that would have resulted in the lowest cost. As the analysis is now complete, the system then flows to step 312 where operation is terminated.

Although one embodiment of the above-described rate plan analysis may use cumulative money charges, as an alternative, the analysis may be performed using cumulative call duration in units of time. It has been determined that using time units rather than money units to perform the rate plan analysis provides several advantages, including enhanced simplicity, flexibility, and accuracy.

Figure 4:
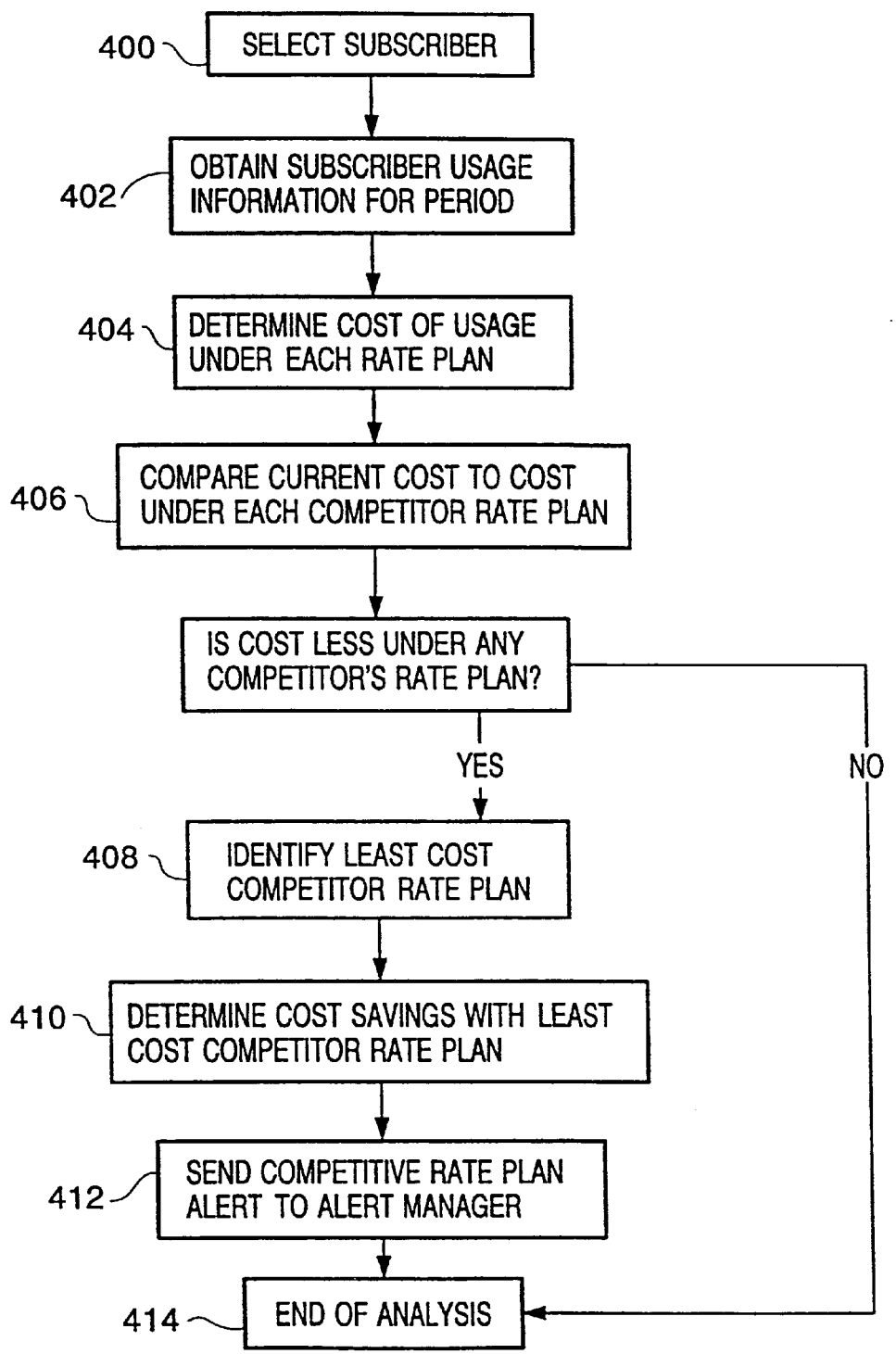
FIG. 4 is a flowchart that illustrates the procedure for using an embodiment of the invention for analysis of a subscriber's usage in relation to competitive rate plans.

FIG. 4 illustrates another embodiment of the present invention wherein the system is used to analyze a subscriber's usage in relation to competitive rate plans. The availability of a competitive rate plan which is more cost-effective for a subscriber may indicate that a subscriber is likely to terminate. Knowledge of the existence of this condition permits a service provider to take preventative action to avoid termination, such as offering a more cost-effective rate plan or other incentives to the subscriber. First, at step 400, the subscriber is selected. Next, at step 402, a record of the usage by that subscriber during a defined time period, such as a month, is obtained. Next, at step 404, the rate plans are identified and the parameters of each rate plan are applied to the usage information to determine the cost of the usage under each rate plan. The rate plan parameters comprise the parameters of the rate plan currently in effect for the subscriber and the parameters of other rate plans offered by competitors which are available to the subscriber.

Next, at step 406, the cost under the rate plan currently in effect for the subscriber is compared to the cost under each of the other rate plans. If the subscriber's cost would have been less under any of the other plans, the system flows to step 408. If not, the analysis is completed and the system flows to step 414 where operation is terminated.

At step 408, the competitor's rate plan that would have had the least cost is identified. Then, at step 410, the cost savings is calculated by subtracting the cost under the least cost plan from the cost under the existing plan. Next, at step 412, a competitive rate plan alert is sent to the alert manager. The competitive rate plan alert comprises information identifying the subscriber, the rate plan currently in effect, the alternative rate plan that would have resulted in the lowest cost, and the amount of cost savings. As the analysis is now complete, the system then flows to step 414 where operation is terminated.

Figure 5:
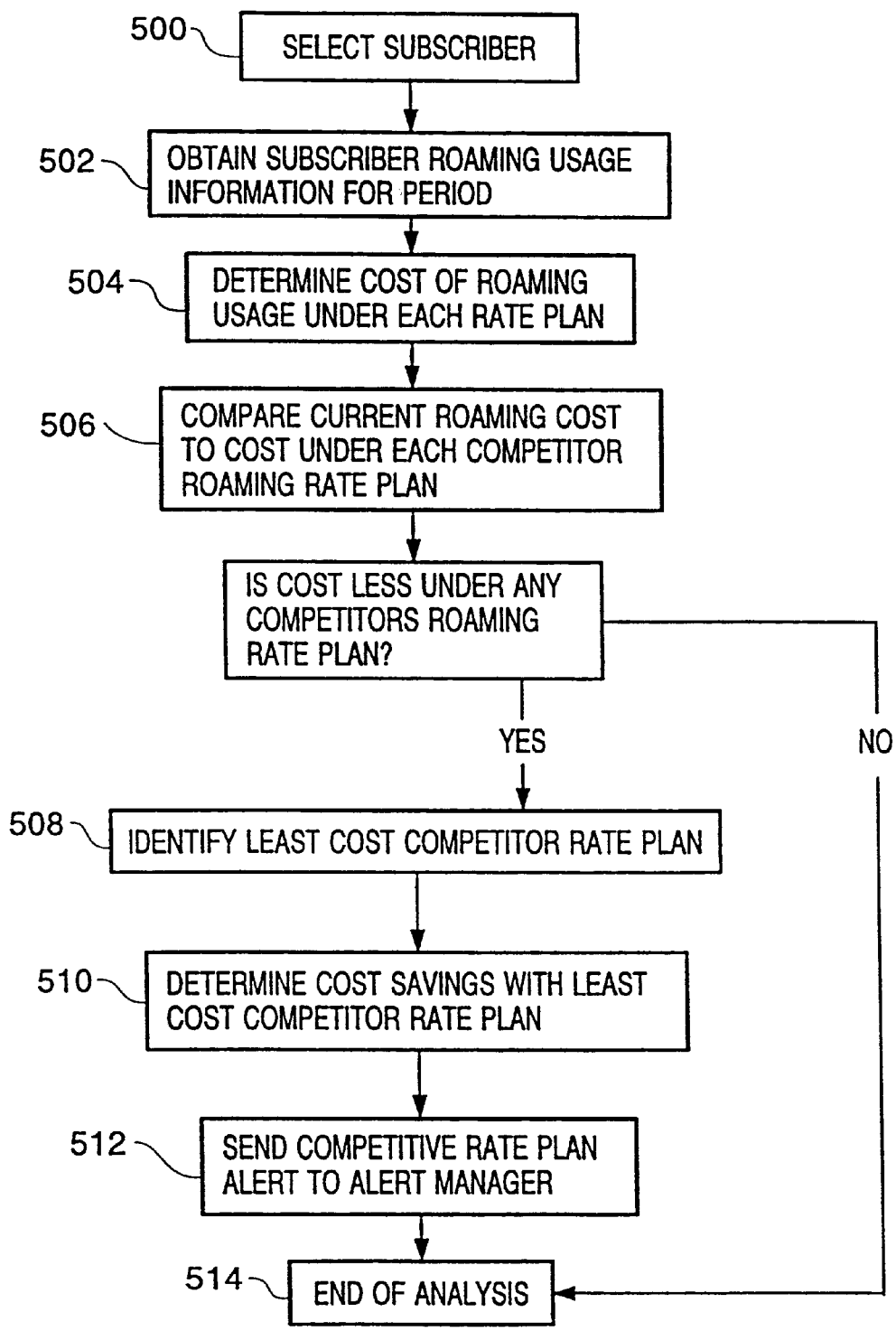
FIG. 5 is a flowchart that illustrates the procedure for using an embodiment of the invention for analysis of a subscriber's usage in relation to roaming rate plans.

FIG. 5 illustrates a further embodiment of the present invention wherein the system is used to analyze a subscriber's usage in relation to competitive roaming rate plans. The availability of a competitive roaming rate plan which is more cost-effective for a subscriber may indicate that a subscriber is likely to terminate. Knowledge of the existence of this condition permits a service provider to take preventative action to avoid termination, such as offering a more cost-effective roaming rate plan or other incentives to the subscriber. Roaming rate plans are rate plans which are primarily concerned with a subscriber's roaming usage. First, at step 500, the subscriber is selected. Next, at step 502, a record of the roaming usage by that subscriber during a defined time period, such as a month, is obtained. Next, at step 504, the rate plans are identified and the parameters of each rate plan are applied to the usage information to determine the cost of the usage under each rate plan. The rate plan parameters comprise the parameters of the roaming rate plan currently in effect for the subscriber and the parameters of other roaming rate plans offered by competitors which are available to the subscriber.

Next, at step 506, the cost under the rate plan currently in effect for the subscriber is compared to the cost under each of the other rate plans. If the subscriber's cost would have been less under any of the other plans, the system flows to step 508. If not, the analysis is completed and the system flows to step 514 where operation is terminated.

At step 508, the rate plan that would have had the least cost is identified. Then, at step 510, the cost savings is calculated by subtracting the cost under the least cost plan from the cost under the existing plan. Next, at step 512, a roaming rate plan alert is sent to the alert manager. The roaming rate plan alert comprises information identifying the subscriber, the roaming rate plan currently in effect, the alternative roaming rate plan that would have resulted in the lowest cost, and the amount of cost savings. As the analysis is now complete, the system then flows to step 514 where operation is terminated.

Figure 6:
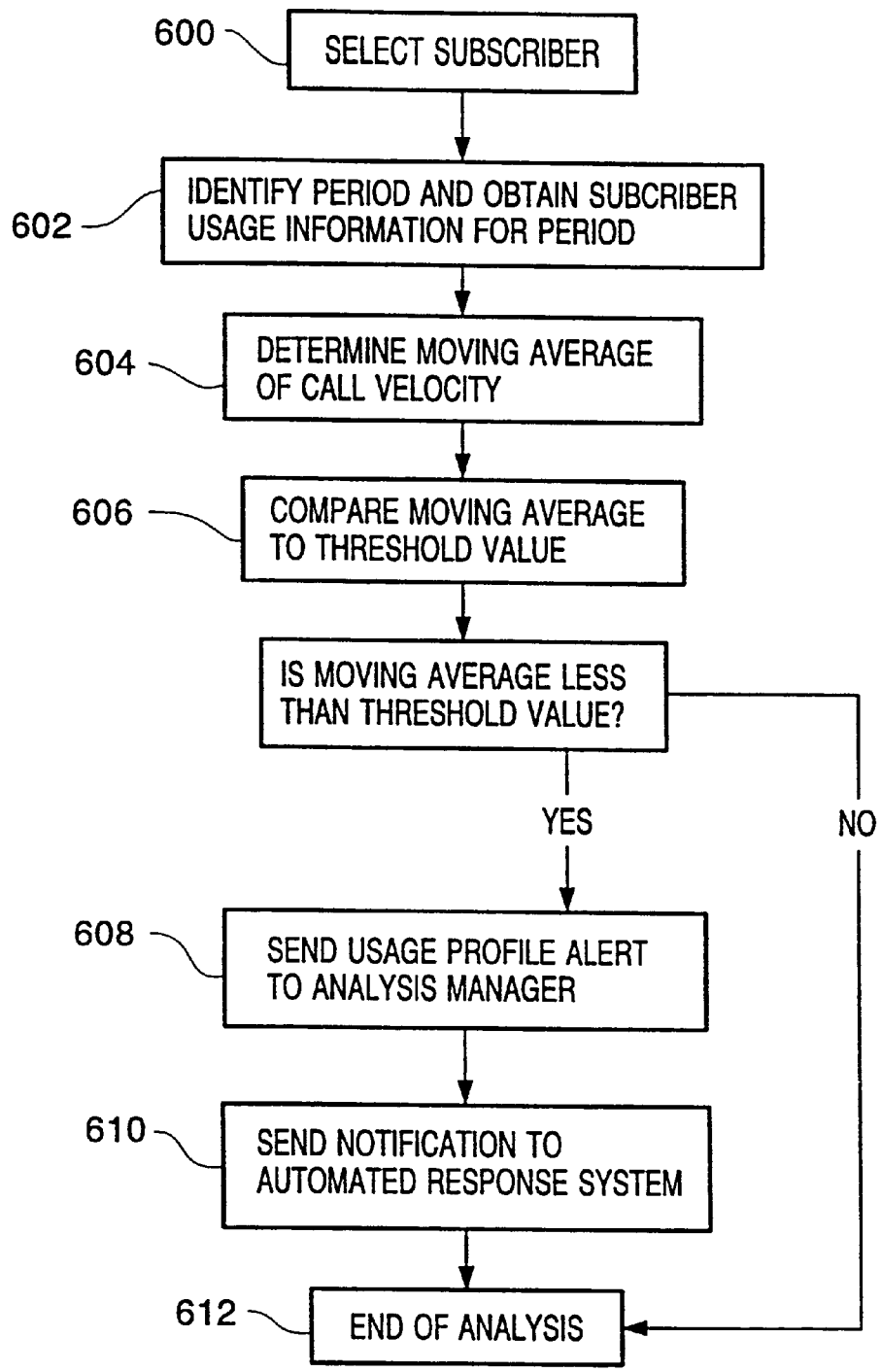
FIG. 6 is a flowchart that illustrates the procedure for using an embodiment of the invention for analysis of a subscriber's usage using a moving average of call velocity and a threshold value.

FIG. 6 illustrates an embodiment of the present invention wherein a moving average of call velocity and a threshold value are used to analyze a subscriber's usage. It has been found that a decline in a subscriber's usage is an indication of possible service termination. Consequently, action may need to be taken by a service provider if usage falls below a defined threshold.

A moving average is a technique used in time-series analysis to smooth a series or to determine a trend in a series, calculated by the equation:

$$m_{n,d} = \frac{\sum_{k=n+1-d}^{n} u_k}{d}$$

where $m_{n,d}$ is the moving average on day n; k is an index counter; d is the number of days over which the average is calculated and $u_1, u_2, \ldots, u_n$ are a series of values to be averaged. For example, assume a series of values over day 21 to day 25 where $u_{21}=16$, $u_{22}=9$, $u_{23}=12$, $u_{24}=8$, and $u_{25}=15$. To calculate a five-day moving average on the 25th day, $M_{25}$, n is equal to 25, d is equal to 5, and k takes the successive values 21, 22, 23, 24, and 25.
Therefore:

$$\begin{aligned} m_{25,5} &= \frac{u_{21} + u_{22} + u_{23} + u_{24} + u_{25}}{5} \\ &= \frac{16 + 9 + 12 + 8 + 15}{5} \\ &= 12. \end{aligned}$$

For example, a ten-day moving average of call velocity is calculated by summing the number of calls originated within the ten days by a particular subscriber and dividing the total by ten.

First, at step 600, the subscriber is selected. Next, at step 602, the last day of the period to be analyzed is identified and a record of the usage by that subscriber during a defined time period, such as ten days, preceding and including the last day of the period is obtained. It should be appreciated that in alternative embodiments the relevant time period may be identified in various ways, such as by identifying first day of the period, and that the period may also be defined by identifying the first and last days of the period. Although a ten day period has been found to be useful in the practice of the invention it should be appreciated that other time periods, such as five days or fourteen days, are included within the scope of the present invention. Next, at step 604, the moving average of call velocity for the defined time period is determined.

Next, at step 606, the moving average is compared to a threshold value, which is established by the service provider. The threshold value may comprise a fixed number, or a percentage or fraction of the moving average. If the moving average is less than the threshold value, the system flows to step 608. If not, the analysis is completed and the system flows to step 612 where operation is terminated.

At step 608, a usage profile alert is sent to the alert manager. The usage profile alert comprises information identifying the subscriber and information relating to the decrease in usage below the threshold amount. Next, the system flows to step 610, where a notification is sent to the automated response system. As the analysis is now complete, the system then flows to step 612 where operation is terminated.

Figure 7:
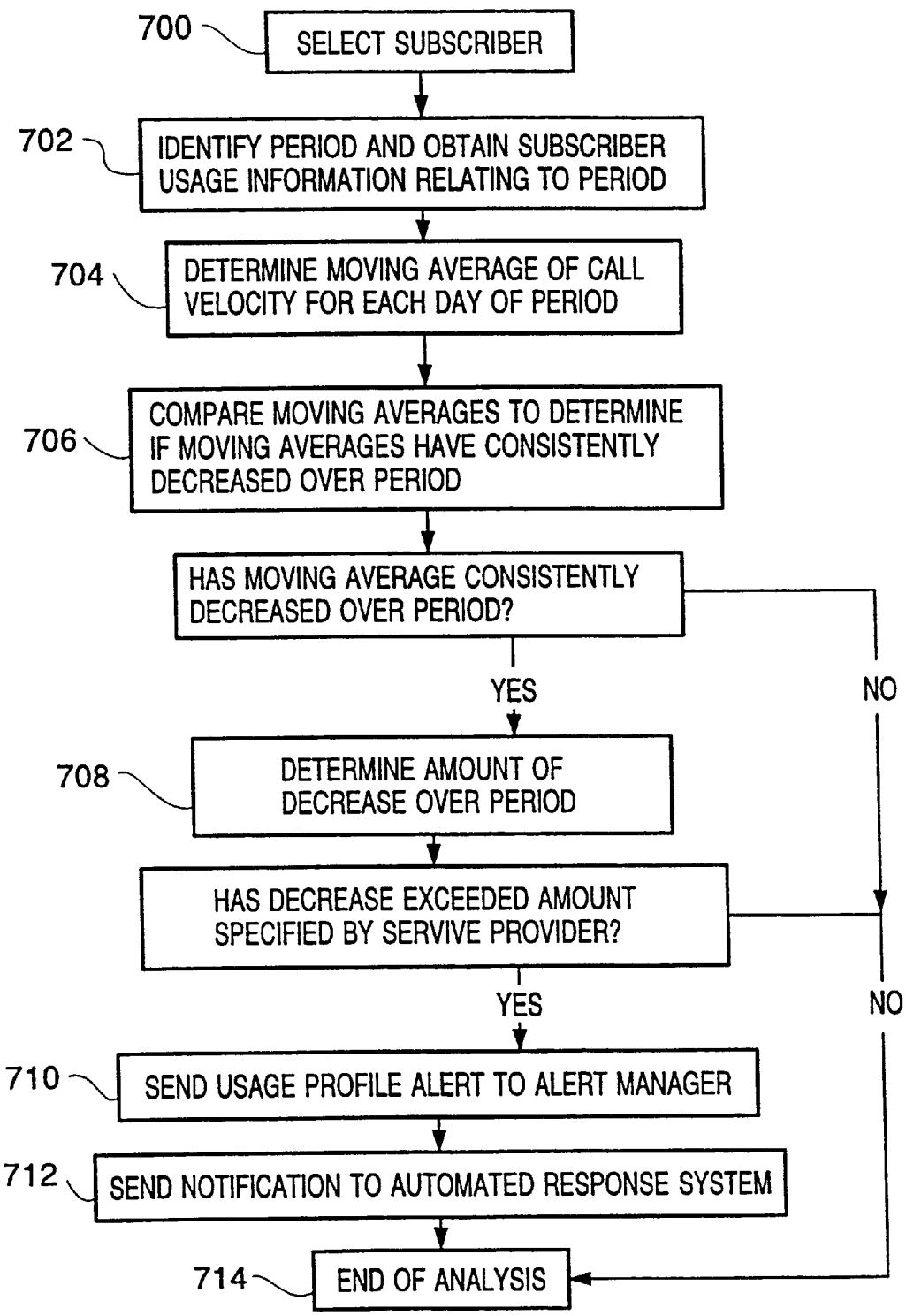
FIG. 7 is a flowchart that illustrates the procedure for using an embodiment of the invention for analysis of a subscriber's usage using changes in a moving average of call velocity.

FIG. 7 illustrates an embodiment of the present invention wherein change in the moving average of call velocity is used to analyze a subscriber's usage. It has been found that a subscriber may be more likely to terminate service if their rate of usage declines over a period of time, and action may need to be taken by a service provider if usage declines a significant amount over a given time period, which is established by the service provider. In the embodiment discussed below, the given time period in days established by the service provider is represented as "n."

First, at step 700, the subscriber is selected. Next, at step 702, the last day of the period to be analyzed is identified and a record of the usage by that subscriber during the relevant time period "r" preceding and including the last day of the period is obtained. It has been found advantageous to identify the last day of the analysis period as the present day. The relevant time period is determined by the information needed to determine a series of daily moving averages for each day of time period "n" preceding and including the last day of the period. Therefore, if each moving average is computed over "d" number of days, the relevant time period "r" is equal to n+d. As discussed above, it will be appreciated that time period "n" may be identified in various ways.

Next, at step 704, the "d" day moving average for each of "n" days is calculated. For example, if the given time period was day 10 through day 15, and a ten day moving average is used, n=5 , d=10 and r=15. Accordingly, a moving average for day 10 is calculated using the information from days 1 through 10 and a moving average for each of day 11 through day 15 is calculated in like manner.

Next, at step 706, the moving averages are compared to determine if the moving averages have consistently decreased during the given time period. If so, the system flows to step 708. If not, the analysis is completed and the system flows to step 714 where operation is terminated.

At step 708, the first moving average is compared with the last moving average to determine the amount of decrease over the period "n." If the amount of the decrease, which may be characterized as a percentage, exceeds an amount specified by the service provider, the system flows to step 710. If not, the analysis is completed and the system flows to step 714 where operation is terminated.

At step 710, a usage profile alert is sent to the alert manager. The usage profile alert comprises information identifying the subscriber and information relating to the decrease in usage. Next, the system flows to step 712, where a notification is sent to the automated response system. As the analysis is now complete, the system then flows to step 714 where operation is terminated.

Although in the embodiment discussed above moving averages for a series of days are generated by step 704, in another embodiment a moving average may be calculated each day by the system and stored in a database. In such an embodiment, it would only be necessary to identify and retrieve the moving averages corresponding to the dates of the desired period when such information is needed for a particular analysis. In like manner, it will be appreciated that such a technique of calculating and storing results on a daily basis would be generally applicable in embodiments of the invention which would otherwise generate a series of time dependent values.

Figure 8:
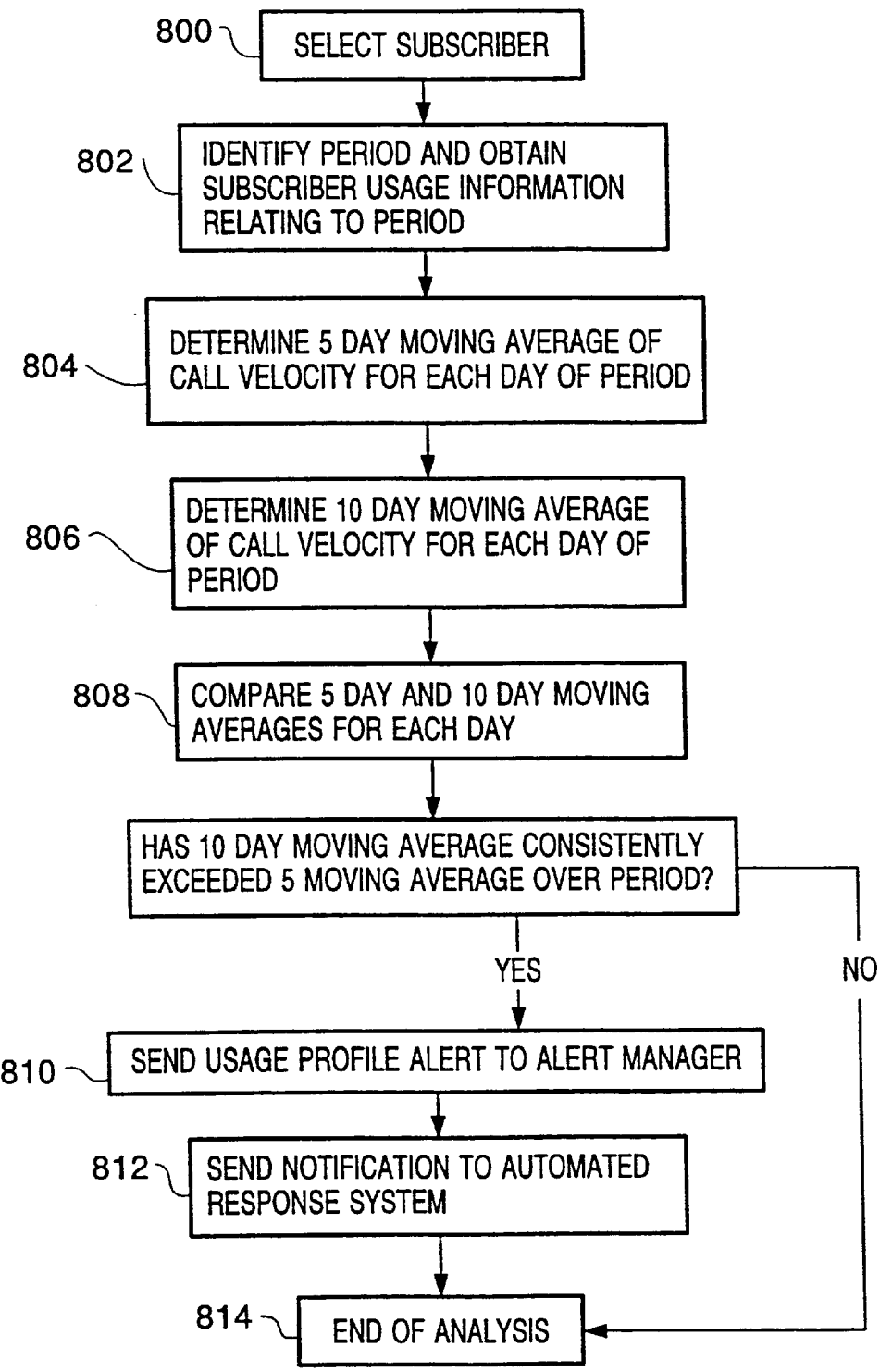
FIG. 8 is a flowchart that illustrates the procedure for using an embodiment of the invention for analysis of a subscriber's usage using multiple moving averages.

FIG. 8 illustrates an embodiment of the present invention wherein a subscriber's usage is analyzed through the use of multiple moving averages calculated over differing time periods. It has been found that a subscriber may be more likely to terminate service if their rate of usage declines over a period of time, and action may need to be taken by a service provider if usage declines a significant amount over a given time period, which is established by the service provider. Decrease in the rate of usage is determined by comparing a series of ten day moving averages of call velocity for each day of the given time period to a series of five day moving averages of call velocity for each of the same days. In the embodiment discussed below, the given time period in days is represented as "n."

First, at step 800, the subscriber is selected. Next, at step 802, the last day of the period to be analyzed is identified and a record of the usage by that subscriber during the relevant time period "r" preceding and including the last day of the period is obtained. The relevant time period is determined by the information needed to determine a series of daily moving averages for each day of the longer of the moving average time periods, in this case ten days. Therefore, the relevant time period "r" is equal to 10+d.

Next, at step 804, the five day moving average for each of "n" days is calculated. For example, if the given time period was day 10 through day 15, a five day moving average for day 10 is calculated using the information from days 6 through 10 and a five day moving average for each of day 11 through day 15 is calculated in like manner.

Next, at step 806, the ten day moving average for each of "n" days is calculated. For example, if the given time period was day 10 through day 15, a ten day moving average for day 10 is calculated using the information from days 1 through 10 and a ten day moving average for each of day 11 through day 15 is calculated in like manner.

Next, at step 808, the five day moving average for each day are compared to the ten day moving average for each of the same days to determine if the ten day moving average for each day consistently exceeded the five day moving average during the elapsed time period. If so, the system flows to step 810. If not, the analysis is completed and the system flows to step 814 where operation is terminated.

At step 810, a usage profile alert is sent to the alert manager. The usage profile alert comprises information identifying the subscriber and information relating to the decrease in usage. Next, the system flows to step 812, where a notification is sent to the automated response system. As the analysis is now complete, the system then flows to step 814 where operation is terminated.

Although this embodiment of the present invention characterizes subscriber-specific usage patterns by utilizing two moving averages calculated over five days and ten days, respectively, it should be noted that an alternative embodiment may utilize other types of characterizing schemes, for example a weighted moving average. Additionally, even if moving averages are utilized, a different number of moving averages, for example one, three or more, may be used as deemed effective. Moreover, the moving averages may be calculated over a number of days different than five and ten, as desired.

Figure 9:
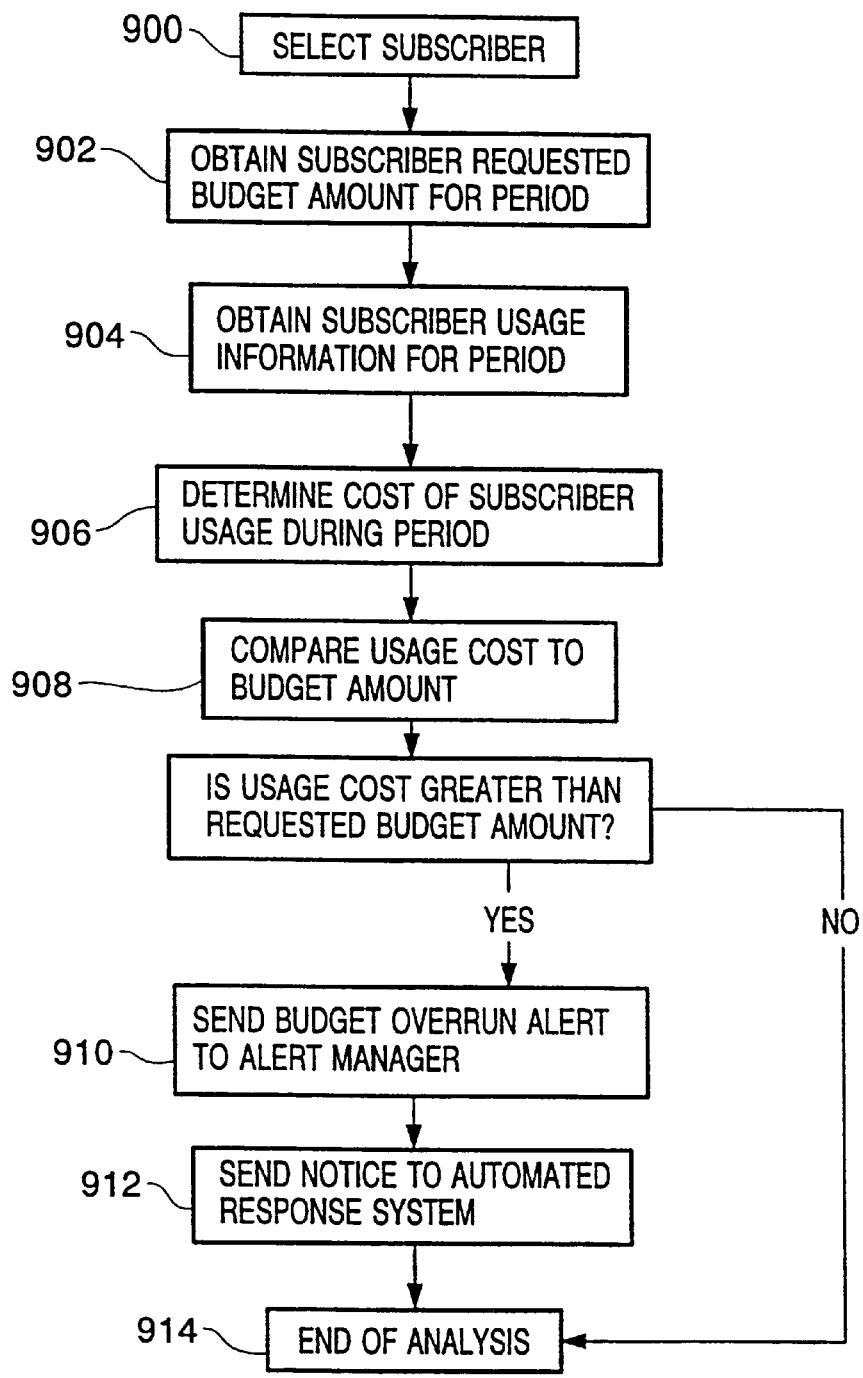
FIG. 9 is a flowchart that illustrates the procedure for using an embodiment of the invention for analysis of a subscriber's usage in relation to budget over-runs.

FIG. 9 illustrates one embodiment of the present invention wherein the system is used to analyze a subscriber's usage in relation to a budgeted amount. The ability to assist a subscriber in managing and controlling budgeted expenditures has been found to assist in maintaining and enhancing the goodwill of the subscriber and an aid to preventing termination. First, at step 900, the subscriber is selected. Next, at step 902, the subscriber's requested budget amount for a defined time period, such as the current month, is obtained. Next, at step 904, a record of the usage by that subscriber during the defined time period is obtained. Next, at step 906, the parameters of the rate plan currently in effect for the subscriber are applied to the usage information to determine the cost of the subscriber's cumulative usage during the period.

Next, at step 908, the cost of the cumulative usage is compared to the budgeted amount to determine if the subscriber has overrun his budget for the period. If so, the system flows to step 910. If not, the analysis is completed and the system flows to step 914 where operation is terminated.

At step 910, a budget overrun alert is sent to the alert manager. The budget overrun alert comprises information identifying the subscriber, the period, the budget amount and the cumulative cost. Next, at step 912, a notice is sent to the automated response system. As the analysis is now complete, the system then flows to step 914 where operation is terminated.

Although the embodiment described rate above uses cumulative money charges, as an alternative, the analysis may be performed using cumulative call duration in units of time. It has been determined that using time units rather than money units to perform budget over run analysis provides several advantages, including enhanced simplicity, flexibility, and accuracy.

Although not illustrated in FIG. 9, in another embodiment of the invention the apparatus may be used to generate a warning to a subscriber that the subscriber may be likely to exceed a budgeted amount for a period. In a case where the end of a budget period has not yet been reached, the subscriber's cumulative cost to date can be determined and compared to the budgeted amount for the entire period. If the cumulative cost is below the budgeted amount, but above a threshold amount established by the service provider, the subscriber may be notified of the cumulative cost to date. Alternatively, in another embodiment, an average usage per day may be calculated and used to determine whether continued use at the average rate for the remainder of the period would cause the budgeted amount to be exceeded. If so, the subscriber may be notified in order that he may reduce use or otherwise modify his calling behavior to stay within the budgeted amount. It will be appreciated that various means may be used to forecast the use for the remainder of a period, such as a moving average or a weighted moving average, or comparison of moving averages.

Figure 10:
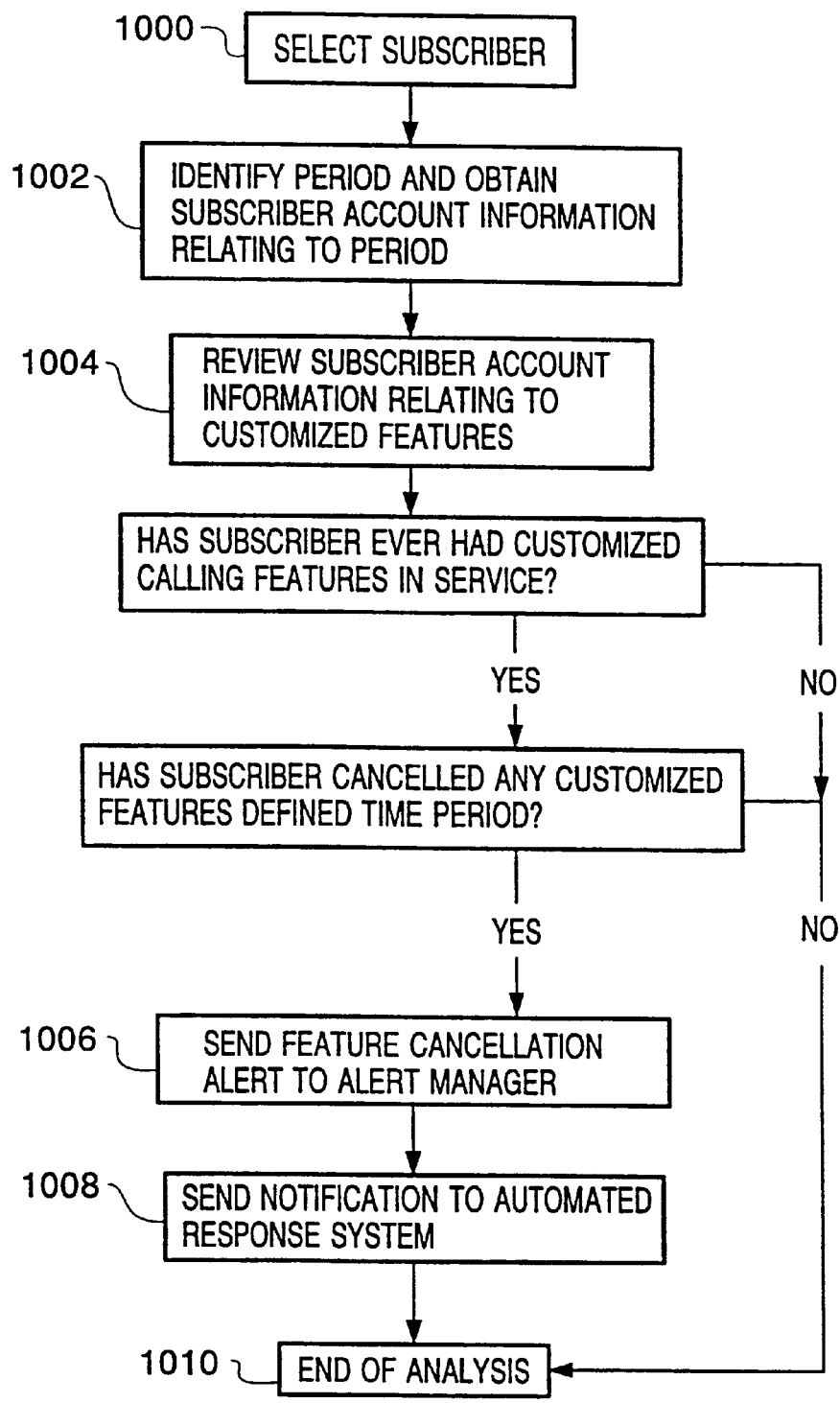
FIG. 10 is a flowchart that illustrates the procedure for using an embodiment of the invention for analysis of a subscriber's account information relating to customized calling features.

FIG. 10 illustrates an embodiment of the present invention wherein a subscriber's account information is analyzed to determine the status of customized calling features, such as call waiting, call forwarding, or three-way calling. It has been found that cancellation of customized calling features may indicate that the subscriber is likely to terminate service entirely.

First, at step 1000, the subscriber is selected. Next, at step 1002, a time period is identified and the subscriber's account information is obtained. If the subscriber has not had any customized calling features in service, the analysis is complete and the system flows to step 1010 where operation is terminated. If the subscriber has had customized calling features in service, the system flows to step 1004. At step 1004, the account information is reviewed to determine if the subscriber has cancelled any customized features during a defined preceding time period. Although many time periods may be used, it has been found useful to define the time period as the present day.

If the subscriber has not cancelled any customized calling features during the defined time period, the analysis is complete and the system flows to step 1010 where operation is terminated. If the subscriber has cancelled customized calling features during the defined time period, the system flows to step 1006 where a feature cancellation alert is sent to the alert manager. The system then flows to step 1008 where a notice is sent to the automated response system. As the analysis is now complete, the system then flows to step 1010 where operation is terminated.

Figure 11:
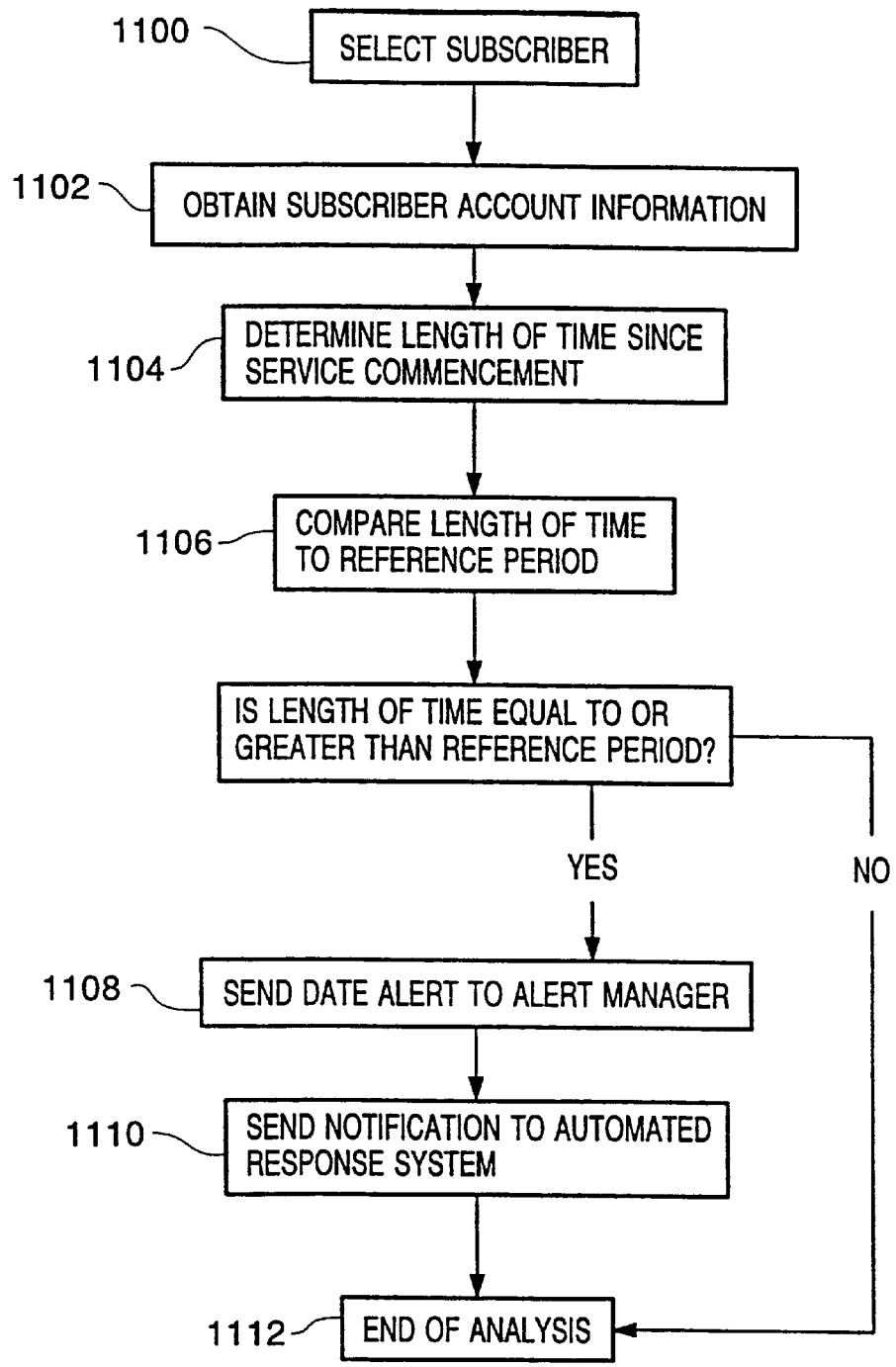
FIG. 11 is a flowchart that illustrates the procedure for using an embodiment of the invention for analysis of a subscriber's account information relating to length of service.

FIG. 11 illustrates an embodiment of the present invention wherein a subscriber's account information is analyzed to determine the length which has passed since the commencement of service. Subscribers tend to be more likely to terminate service at the end of a contract period, or a promotional period, or other identifiable period and the invention can indicate the impending approach of such a date.

First, at step 1100, the subscriber is selected. Next, at step 1102, the subscriber's account information, comprising a service commencement date, is obtained. Next, at step 1004, the service commencement date is compared to the present date to determine the length of the time period between the commencement date and the present date.

Next, at step 1106 the length of the period is compared to a reference period selected by the service provider. The reference period may represent the time period of a contract, or of a special promotion, or other identifiable period which relates to the subscriber's likelihood of cancellation. The reference period may also reflect a period less than the full term of a relevant period, which would permit the invention to generate an advance notice. For example, for a subscriber who has a one year service contract, the service provider may chose to set the reference period at eleven months in order that the system would provide a month's notice prior to the end of the contract term.

If the length of the period of use is less than the reference period, the analysis is complete and the system flows to step 1112 where operation is terminated. If length of the period of use is equal to or greater than the reference period, the system flows to step 1108 where a date alert is sent to the alert manager. The system then flows to step 1110 where a notice is sent to the automated response system. As the analysis is now complete, the system then flows to step 1112 where operation is terminated.

Figure 12:
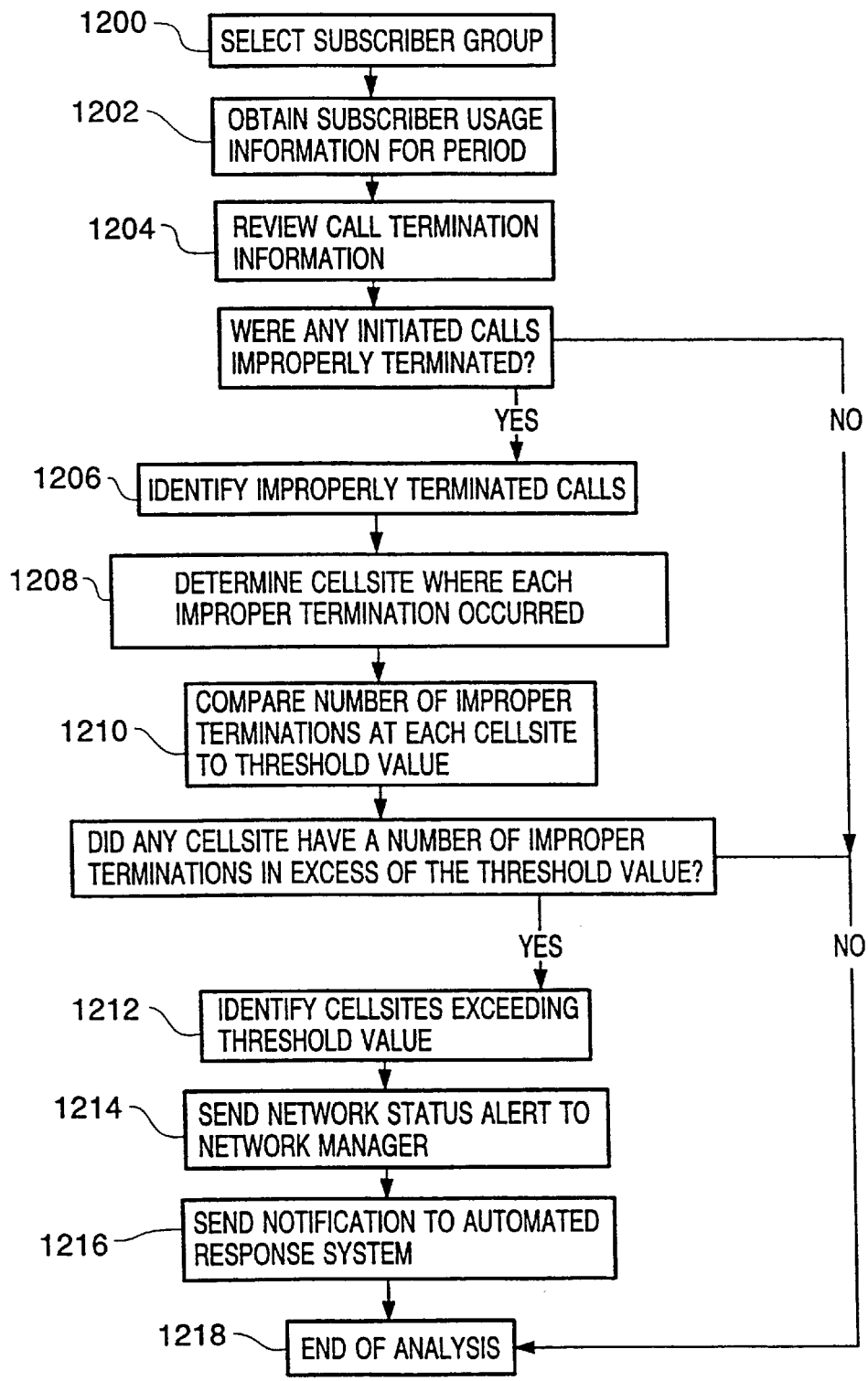
FIG. 12 is a flowchart that illustrates the procedure for using an embodiment of the invention for analysis of subscriber usage information relating to improper termination of service.

FIG. 12 illustrates an embodiment of the invention wherein subscriber usage information relating to improper termination of service is analyzed. Improper termination occurs when a subscriber's usage is interrupted or terminated during a call prior to action by a party to the call to terminate the call. In many instances, improper termination is a result of technical problems at a cellsite where the call is being handled. When a subscriber initiates a call, the cellsite closest to the location of the subscriber is used. If the subscriber changes locations during a call, the call may be transferred, or "handed off," to another cellsite. Improper termination of a call may thus occur at a single cellsite, multiple cell sites, or during the transfer of a call from one cellsite to another. A large number of improper call terminations may indicate the need for maintenance at a cellsite and may also identify subscribers which are unhappy with the quality of the service and therefore likely to terminate their service.

First, at step 1200, the relevant subscriber group is selected. The relevant subscriber group may be a single subscriber, a selected number of subscribers, or all subscribers to a service provider. Next, at step 1202, call termination information relating to all calls made by the relevant subscriber group during a defined time period selected by the service provider is obtained. To provide timely response to problems, it has been found effective in the practice of the present invention to use the current day as the defined time period, but it will be appreciated that longer and shorter periods may also be used.

Next, at step 1204, the call termination information is reviewed to determine if any of the calls were improperly terminated. If no calls were improperly terminated, the analysis is complete and the system flows to step 1218 where operation is terminated. If any calls were improperly terminated, the system flows to step 1206, where the calls which were improperly terminated are identified. Next, at step 1208, the cellsite where each improper termination occurred is determined for each identified call.

Next, at step 1210, the total number of improper terminations for each cellsite during the defined time period is determined and each total is compared to a threshold value established by the service provider. If none of the totals exceed the threshold value, the analysis is completed and the system flows to step 1218 where operation is terminated. If any of the totals exceed the threshold, the system flows to step 1212, where the cellsites having a total number of improper terminations exceeding the threshold value are identified. The system then flows to step 1214, where a network status alert is sent to the network manager. The network status alert comprises information identifying each cellsite where the total exceeds the threshold and information relating to each improper termination at those cellsites. Next, the system flows to step 1216 where a notice is sent to the automated response system. Finally, the analysis is complete and the system flows to step 1218, where operation is terminated. While the embodiment discussed above is used to identify potential problem cellsites, it should be appreciated that the invention could be used to identify other types or pieces of equipment which are associated with improper terminations, such as a particular phone.

Figure 13:
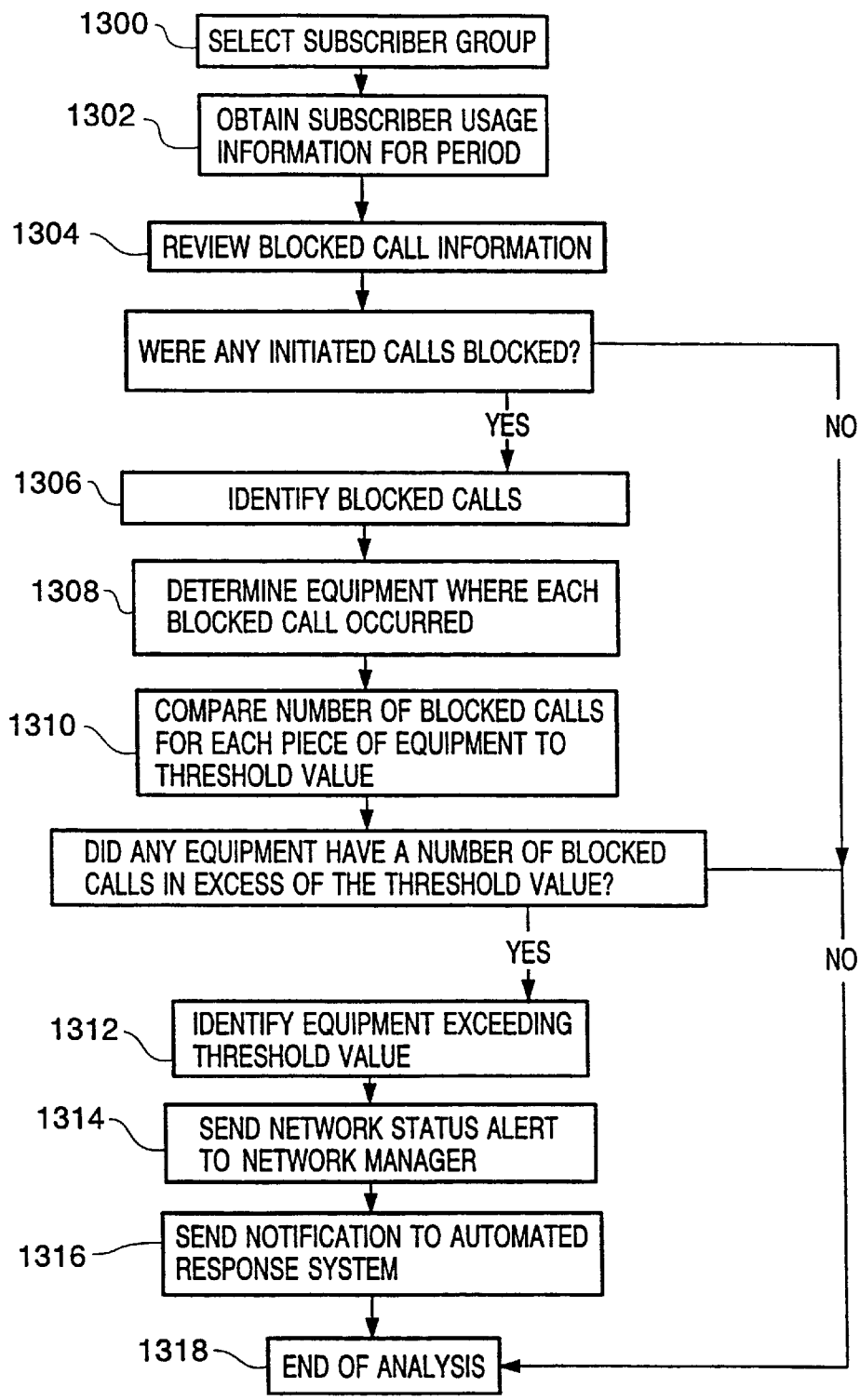
FIG. 13 is a flowchart that illustrates the procedure for using an embodiment of the invention for analysis of subscriber usage information relating to blocked calls.

FIG. 13 illustrates an embodiment of the invention wherein subscriber usage information relating to blocked calls is analyzed. Blocked calls occur when a subscriber attempts to place a call but is unable to complete the connection. In many instances, a blocked call results from inadequate equipment capacity or equipment malfunction. One common cause of equipment malfunction occurs when a particular cellular phone goes slightly out of tune. A large number of blocked calls may indicate the need for equipment maintenance and may also identify subscribers which are unhappy with the quality of the service and therefore likely to terminate their service.

First, at step 1300, the relevant subscriber group is selected. The relevant subscriber group may be a single subscriber, a selected number of subscribers, or all subscribers to a service provider. Next, at step 1302, blocked call information relating to all calls attempted by the relevant subscriber group during a defined time period selected by the service provider is obtained. To provide timely response to problems, it has been found effective in the practice of the present invention to use the current day as the defined time period, but it will be appreciated that longer and shorter periods may also be used.

Next, at step 1304, the blocked call information is reviewed to determine if any of the calls were attempted without success, or blocked. If no calls were blocked, the analysis is complete and the system flows to step 1318 where operation is terminated. If any calls were blocked, the system flows to step 1306, where the blocked calls are identified. Next, at step 1308, the equipment which caused the blocked call determined for each identified call.

Next, at step 1310, the total number of blocked calls for each piece of equipment for each cellsite during the defined time period is determined and each total is compared to a threshold value established by the service provider. If none of the totals exceed the threshold value, the analysis is completed and the system flows to step 1318 where operation is terminated. If any of the totals exceed the threshold, the system flows to step 1312, where the pieces of equipment having a total number of blocked calls exceeding the threshold value are identified. The system then flows to step 1314, where a network status alert is sent to the network manager. The network status alert comprises information identifying each piece of equipment where the total exceeds the threshold and information relating to each blocked call attributed to that piece of equipment. Next, the system flows to step 1316 where a notice is sent to the automated response system. Finally, the analysis is complete and the system flows to step 1318, where operation is terminated.

Figure 14:
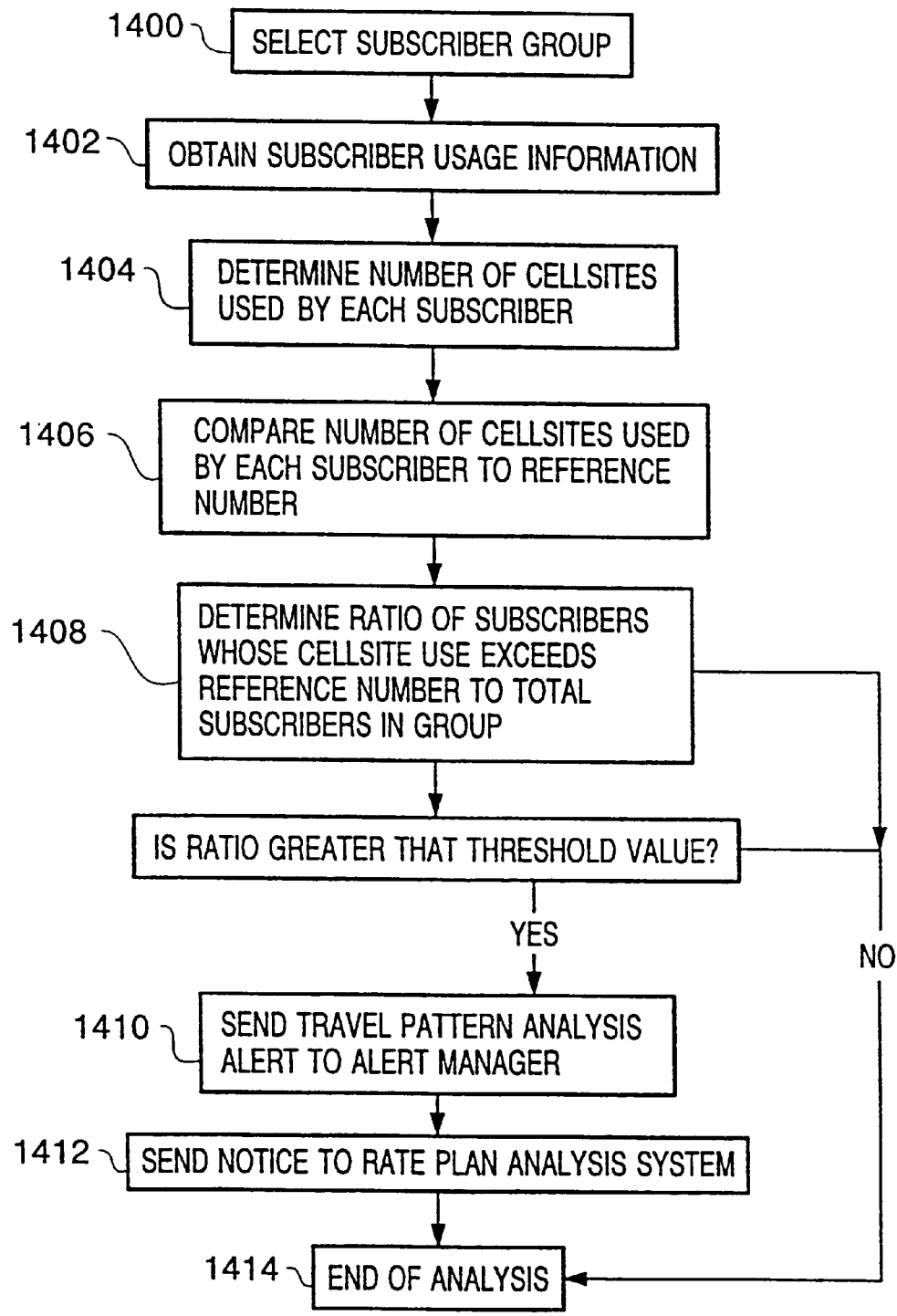
FIG. 14 is a flowchart that illustrates the procedure for using an embodiment of the invention for analysis of subscriber usage information relating to subscriber travel patterns.

FIG. 14 illustrates an embodiment of the invention wherein subscriber usage information relating to subscriber travel patterns is analyzed. Analysis of the travel patterns of a group of subscribers is useful in determining whether consumer satisfaction would be increased if a service provider was to offer a new plan to those subscribers. While many parameters may be analyzed to determine travel patterns, in the embodiment illustrated in FIG. 14 the cellsites where calls are initiated and handed off are identified.

First, at step 1400, the relevant subscriber group is selected. The relevant subscriber group may be a single subscriber, a selected number of subscribers, or all subscribers to a service provider. Next, at step 1402, usage information relating to all calls made by each member of the relevant subscriber group during a defined time period selected by the service provider is obtained.

Next, at step 1404, the usage information of each subscriber is reviewed to determine the number of cellsites used by that subscriber during the time period. A cellsite is "used" for purposes of this embodiment when a call is initiated on the cellsite or a call is handed off to the cellsite. Next, at step 1406, the number of cellsites used by each subscriber is compared to a reference number of cell sites established by the service provider to determine how many of the subscribers used a number of cellsites greater than the reference number.

Next, at step 1408, the ratio of subscribers whose cellsite use exceeds the reference number to the total number of subscribers is determined. If the ratio is not greater than a threshold value established by the service provider, the analysis is complete and the system flows to step 1414 where operation is terminated. If the ratio exceeds the threshold value, the system flows to step 1410, where a travel pattern analysis alert is sent to the alert manager. The travel pattern analysis alert comprises the percentage of subscribers whose use exceeds the reference number. Next, the system flows to step 1412, where a notice is sent to a rate plan analysis system. Finally, the analysis is complete and the system flows to step 1414, where operation is terminated.

Figure 15:
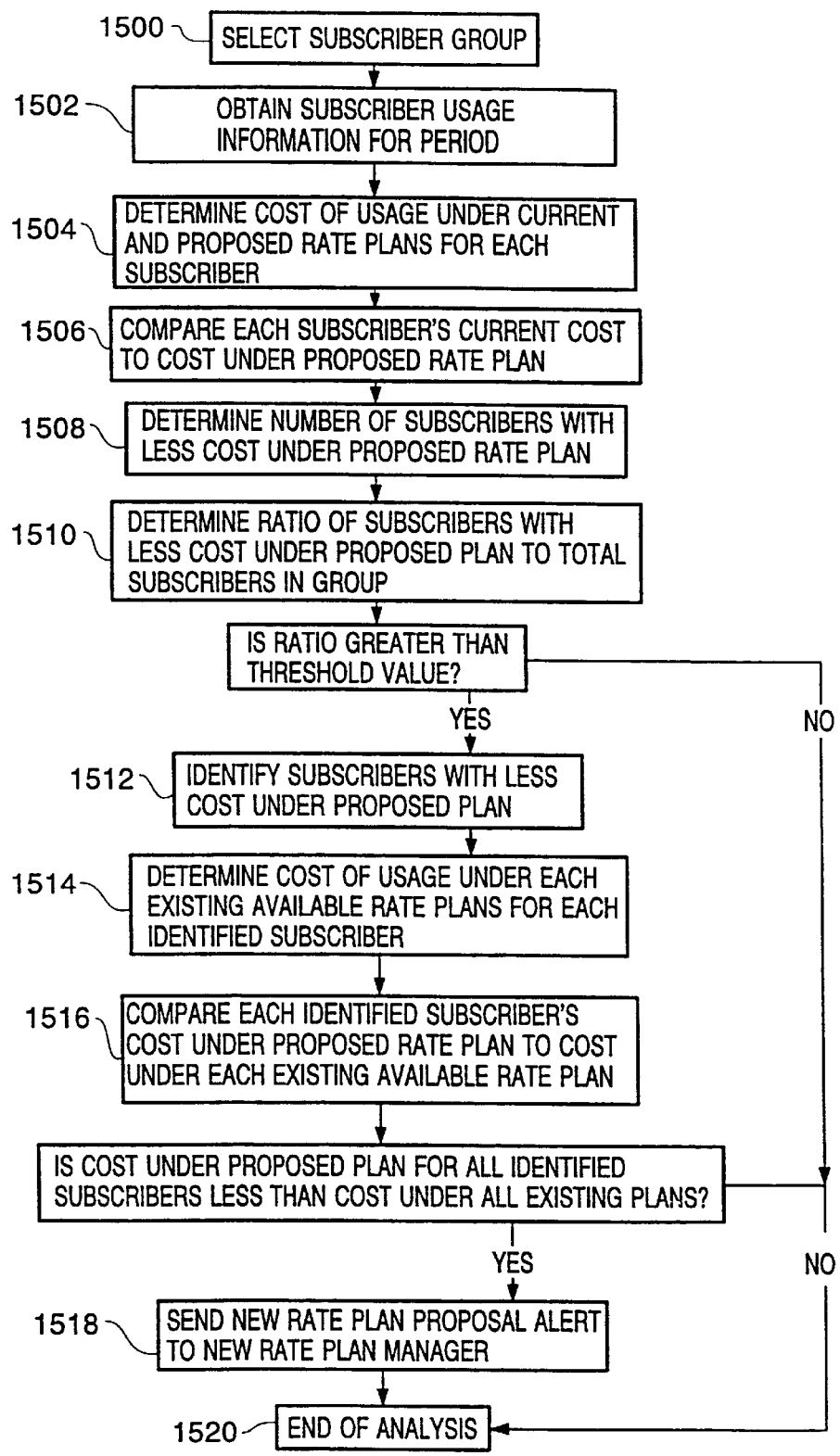
FIG. 15 is a flowchart that illustrates the procedure for using an embodiment of the invention for analysis of subscriber usage information in relation to proposed rate plans.

FIG. 15 illustrates one embodiment of the present invention wherein the system is used to analyze the usage of a group of subscribers in relation to a proposed new rate plan and to existing rate plans. First, at step 1500, the relevant subscriber group is selected. The relevant subscriber group may be a single subscriber, a selected number of subscribers, or all subscribers to a service provider. Next, at step 1502, usage information relating to all calls made by each member of the relevant subscriber group during a defined time period selected by the service provider is obtained.

Next, at step 1504, the current and proposed rate plans are identified and the parameters of each rate plan are applied to the usage information to determine the cost of the usage under each rate plan for each subscriber. The current rate plan is the plan currently in effect for that subscriber.

Next, at step 1506, the cost under the rate plan currently in effect for each subscriber is compared to the subscriber's cost under the proposed rate plan. Then, at step 1508, the number of subscribers whose usage would have cost less under the proposed rate plan is determined.

Next, at step 1510, the ratio of the number of subscribers whose cost would have been less under the proposed plan to the total number of subscribers is determined. If the ratio is not greater than a threshold value established by the service provider, the analysis is complete and the system flows to step 1520 where operation is terminated. If the ratio exceeds the threshold value, the system flows to step 1512, where the subscribers whose cost would have been less under the proposed plan are identified. Next, at step 1514 the parameters of each existing rate plan are applied to the usage information for each identified subscriber to determine the cost of the usage under each existing rate plan for each identified subscriber. The existing rate plans include all of the rate plans offered by the subscriber for which the identified subscriber is eligible, other than the rate plan currently in effect for that subscriber.

Next, at step 1516, for each existing rate plan the cost of each subscriber's usage under the proposed rate plan is compared to the cost of the subscriber's usage under the existing rate plan. If the cost of any existing plan for any subscriber would have been lower than the cost of the proposed plan for that subscriber, the analysis is complete and the system flows to step 1520 where operation is terminated. If usage under the proposed plan would have cost less than or equal to the lowest cost existing plan for all identified subscribers, the system flows to step 1518, where a new rate plan proposal alert is sent to the new rate plan manager. The rate plan proposal alert comprises information identifying the subscriber group, the proposed rate plan, and the cost savings to the subscribers under the proposed rate plan. Finally, the analysis is complete and the system flows to step 1520, where operation is terminated.

Although the embodiment described above uses a single proposed rate plans and a number of existing rate plans, in alternative embodiments multiple proposed rate plans, or a single existing rate plan, or both, could similarly be used. It will further be appreciated that the effect of a proposed rate plan could be analyzed with reference to a group of subscribers, particularly in connection with determining potential cost savings for the group as a whole, rather than upon each individual subscriber basis as illustrated above.

Thus, a system for detecting customer dissatisfaction and preventing subscriber termination is provided which possesses several features and advantages. Initially, it should be noted that although several embodiments of the invention were described from the perspective of a single subscriber or information relating to a single subscriber processed in serial fashion, in actual operation the system can process information relating to multiple subscribers in parallel, thereby resulting in increased through-put and shorter overall processing time.

Second, the system is capable of detecting the presence of conditions which tend to cause subscriber termination in advance of actual termination, thus permitting corrective action to be taken.

Third, the system may be used to detect conditions which affect a single subscriber, and which may be related to that particular subscriber's usage pattern, as well as detecting system-wide conditions or conditions which affect defined groups of subscribers.

Fourth, the system may be used to promote the goodwill of subscribers and to maintain and increase customer satisfaction.

Fifth, the system provides a means for determining the potential impact on service providers and consumers of rate plans and other service features offered by competitors.

Sixth, since the system of the present invention operates merely by connecting the system to existing network facilities, and requires no modification of the either the telecommunications network equipment or the individual cellular telephones, the present system is compatible with most, if not all, existing telecommunications systems. In addition, the system may be integrated with other systems which use some of the same subscriber related information, such as fraud detection systems and billing systems.

Further, and among other advantages, because several of the threshold parameters are defined by the service provider and the system includes the ability to identify specific subscribers or groups of subscribers, the system is readily adapted to satisfy the unique requirements of any telecommunications system to which it is attached, as well as accommodate changes to the system to reflect the particular experience of a service provider.

Although the invention has been described in detail, it should be understood that various changes, substitutions and alterations can be made herein without departing from the spirit and scope of the invention as defined by the appended claims.

What is claimed is:

1. An apparatus for use in deterring a subscriber of a telecommunications service provider from terminating their subscription, comprising:

a digital computer;

interface means, located within said digital computer, for receiving subscriber related information;

processing means, located within said digital computer, for processing said subscriber related information to determine if there is a likelihood of a subscriber terminating their subscription; and output means, located within said digital computer, for initiating action that can be used on behalf of the telecommunications service provider to deter a subscriber that is likely to terminate their subscription from so doing.

2. An apparatus according to claim 1, wherein:

said interface means includes means for receiving usage information associated with the particular subscriber; and said processing means includes means for using said usage information associated with the subscriber and rate plan information associated with another rate plan offered by the telecommunications service provider to determine if there is a likelihood of the subscriber terminating their subscription.

3. An apparatus according to claim 1, wherein:

said interface means includes means for receiving usage information associated with the particular subscriber;

said interface means includes means for receiving rate plan information associated with a rate plan offered by competing telecommunications service provider; and said processing means includes means for using said usage information associated with the subscriber, rate plan information associated with a rate plan offered by the telecommunications service provider and rate plan information associated with a rate plan offered by a competing telecommunications service provider to determine if there is a likelihood of the subscriber terminating their subscription.

4. An apparatus according to claim 1, wherein:

said interface means includes means for receiving usage information associated with the particular subscriber;

said interface means includes means for receiving roaming rate plan information associated with a rate plan offered by a competing telecommunications service provider; and said processing means includes means for using said usage information associated with the subscriber, roaming rate plan information associated with a rate plan offered by the telecommunications service provider and roaming rate plan information associated with a rate plan offered by a competing telecommunications service provider to determine if there is a likelihood of the subscriber terminating their subscription.

5. An apparatus according to claim 1, wherein:

said interface means includes means for receiving usage information associated with the particular subscriber; and said processing means includes means for using said usage information associated with the subscriber to determine an average call velocity for said subscriber and using said average call velocity to determine if there is a likelihood of the subscriber terminating their subscription.

6. An apparatus according to claim 1, wherein:

said interface means includes means for receiving usage information associated with the particular subscriber; and said processing means includes means for using said usage information associated with the subscriber to determine a moving average of call velocity for said subscriber and using said moving average of call velocity to determine if there is a likelihood of the subscriber terminating their subscription.

7. An apparatus according to claim 1, wherein:

said interface means includes means for receiving usage information associated with the particular subscriber; and said processing means includes means for using said usage information associated with the subscriber to determine a change in a moving average of call velocity for said subscriber and using said change in a moving average of call velocity to determine if there is a likelihood of the subscriber terminating their subscription.

8. An apparatus according to claim 1, wherein:

said interface means includes means for receiving usage information associated with the particular subscriber; and said processing means includes means for using said usage information associated with the subscriber and means for comparing a moving average of call velocity for said subscriber that is calculated over a first time period and a moving average of call velocity for said subscriber that is calculated over a second time period that is different than said first period of time to determine if there is a likelihood of the subscriber terminating their subscription.

9. An apparatus according to claim 1, wherein:

said interface means includes means for receiving usage information associated with the particular subscriber;

said interface means includes means for receiving a budgeted amount; and said processing means includes means for using usage information associated with the subscriber and a budgeted amount to determine if there is a likelihood of the subscriber terminating their subscription.

10. An apparatus according to claim 1, wherein:

said interface means includes means for receiving account information associated with the particular subscriber and related to any calling features associated with the subscriber's service; and said processing means includes means for using account information associated with the subscriber to determine if the subscriber has cancelled any calling features.

11. An apparatus according to claim 1, wherein:

said interface means includes means for receiving account information associated with the particular subscriber and related to a length of time that the service has been provided to the subscriber; and said processing means includes means for using said account information associated with the subscriber to determine a length of time that service has been provided to the subscriber and means for comparing said length of time to a defined period of time to determine if there is a likelihood of the subscriber terminating their subscription.

12. An apparatus according to claim 1, wherein:

said interface means includes means for receiving usage information associated with the particular subscriber; and said processing means includes means for using said usage information to determine if the subscriber has experienced improper call terminations.

13. An apparatus according to claim 1, wherein:

said interface means includes means for receiving usage information associated with the particular subscriber; and said processing means includes means for using said usage information to determine if the subscriber has experienced blocked calls.

14. An apparatus according to claim 1, wherein:

said interface means includes means for receiving usage information associated with the particular subscriber; and said processing means includes means for using said usage information for determining subscriber travel patterns.

15. An apparatus according to claim 1, wherein:

said interface means includes means for receiving usage information associated with the particular subscriber;

said interface means includes means for receiving proposed rate plan information; and said processing means includes means for using said usage information with current rate plan information and proposed rate plan information of the telecommunications service provider to identify action which may be taken to deter a subscriber from terminating their subscription.

16. An apparatus for use in deterring a subscriber of a telecommunications service provider from terminating their subscription, comprising:

digital computer;

interface means, located within said digital computer, for receiving subscriber related billing information;

processing means, located within said digital computer, for processing said subscriber related billing information to determine if there is a likelihood of a subscriber terminating their subscription based upon the existence of a different rate plan from the subscriber's current rate plan that would save the subscriber's current plan that would save the subscriber telecommunication costs and further based upon the assumption that the subscriber is or will become aware of the different rate plan; and output means, located within said digital computer, for initiating action that can be used on behalf of the telecommunications service provider to deter a subscriber that is likely to terminate their subscription from so doing.

17. An apparatus according to claim 16, wherein:

said different rate plan comprises a rate plan offered by the telecommunications service provider.

18. An apparatus according to claim 16, wherein:

said different rate plan comprises a rate plan offered by a competing telecommunications service provider.

19. An apparatus for use in deterring a subscriber of a telecommunications service provider from terminating their subscription, comprising:

a digital computer;

interface means, located within said digital computer, for receiving subscriber related billing information;

processing means, located within said digital computer, for processing said subscriber related billing information to determine if there is a proposed rate plan of the telecommunications service provider that would save the subscriber telecommunication costs relative to the subscriber's current plan; and output means, located within said digital computer, for initiating action that can be used on behalf of the telecommunications service provider to deter a subscriber that is likely to terminate their subscription from so doing.

20. An apparatus for use in deterring a subscriber of a telecommunications service provider from terminating their subscription, comprising:

a digital computer;

interface means, located within said digital computer, for receiving subscriber related call information;

processing means, located within said digital computer, for processing said subscriber related call information to determine if a subscriber has a calling pattern that indicates that the subscriber is likely to terminate their subscription; and output means, located within said digital computer, for initiating action that can be used on behalf of the telecommunications service provider to deter a subscriber that is likely to terminate their subscription from so doing.

21. An apparatus according to claim 20, wherein:

said subscriber related call information is characterized as a moving average.

22. An apparatus according to claim 20, wherein:

said subscriber related call information is characterized as two moving averages having different time periods.

23. An apparatus for use in deterring a subscriber of a telecommunications service provider from terminating their subscription, comprising:

a digital computer;

interface means, located within said digital computer, for receiving subscriber related call information;

processing means, located within said digital computer, for processing said subscriber related call information to determine if the telecommunication service that is being provided to the subscriber is greater than a predetermined standard of service; and output means, located within said digital computer, for initiating action that can be used on behalf of the telecommunications service provider to deter a subscriber that is likely to terminate their subscription due, at least in part, to the standard of service being received by the subscriber.

24. An apparatus according to claim 23, wherein:

said subscriber related call information comprises information relating to improperly terminated calls.

25. An apparatus according to claim 23, wherein:

said subscriber related call information comprises information relating to blocked calls.

26. A method of deterring a subscriber of a telecommunications service provider from terminating their subscription, comprising:

receiving subscriber related information;

processing the subscriber related information to determine if there is a likelihood of a subscriber terminating their subscription; and initiating action that can be used on behalf of the telecommunications service provider to deter a subscriber that is likely to terminate their subscription from so doing.

27. A method of deterring a subscriber of a telecommunications service provider from terminating their subscription, comprising:

receiving subscriber related billing information;

processing the subscriber related billing information to determine if there is a likelihood of a subscriber terminating their subscription based upon the existence of a different rate plan from the subscriber's current rate plan that would save the subscriber's current plan that would save the subscriber telecommunication costs and further based upon the assumption that the subscriber is or will become aware of the different rate plan; and initiating action that can be used on behalf of the telecommunications service provider to deter a subscriber that is likely to terminate their subscription from so doing.

28. A method of deterring a subscriber of a telecommunications service provider from terminating their subscription, comprising:

receiving subscriber related billing information;

processing the subscriber related billing information to determine if there is a proposed rate plan of the telecommunications service provider that would save the subscriber telecommunication costs relative to the subscriber's current plan; and initiating action that can be used on behalf of the telecommunications service provider to deter a subscriber that is likely to terminate their subscription from so doing.

29. A method of deterring a subscriber of a telecommunications service provider from terminating their subscription, comprising:

receiving subscriber related call information;

processing the subscriber related call information to determine if a subscriber has a calling pattern that indicates that the subscriber is likely to terminate their subscription; and initiating action that can be used on behalf of the telecommunications service provider to deter a subscriber that is likely to terminate their subscription from so doing.

30. A method of deterring a subscriber of a telecommunications service provider from terminating their subscription, comprising:

receiving subscriber related call information;

processing the subscriber related call information to determine if the telecommunication service that is being provided to the subscriber is greater than a predetermined standard of service; and initiating action that can be used on behalf of the telecommunications service provider to deter a subscriber that is likely to terminate their subscription due, at least in part, to the standard of service being received by the subscriber.

* * * * *